(12) United States Patent
Piaskowski et al.

(10) Patent No.: US 10,644,897 B2
(45) Date of Patent: May 5, 2020

(54) BUILDING MANAGEMENT SYSTEM USER INTERFACES

(71) Applicant: Johnson Controls Technology Company, Auburn Hills, MI (US)

(72) Inventors: Ryan A. Piaskowski, Milwaukee, WI (US); Charles C. Xing, New Berlin, WI (US); Beth A. Ray, Oak Creek, WI (US); Sayan Chakraborty, Brookfield, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 52 days.

(21) Appl. No.: 15/870,500

(22) Filed: Jan. 12, 2018

(65) Prior Publication Data

US 2018/0205567 A1 Jul. 19, 2018

Related U.S. Application Data

(60) Provisional application No. 62/446,284, filed on Jan. 13, 2017.

(51) Int. Cl.
*H04L 12/28* (2006.01)
*G06F 3/048* (2013.01)
*G06F 17/24* (2006.01)
*H04L 12/46* (2006.01)
*G05B 15/02* (2006.01)

(52) U.S. Cl.
CPC .......... *H04L 12/282* (2013.01); *G05B 15/02* (2013.01); *G06F 3/048* (2013.01); *G06F 17/241* (2013.01); *H04L 12/2827* (2013.01); *H04L 12/4625* (2013.01); *G05B 2219/2642* (2013.01)

(58) Field of Classification Search
CPC .............. H04L 12/282; H04L 12/2827; H04L 12/4625; G05B 15/02; G05B 2219/2642; G06F 3/048; G06F 17/241
See application file for complete search history.

(56) References Cited

U.S. PATENT DOCUMENTS

| | | | |
|---|---|---|---|
| 9,552,720 B2 * | 1/2017 | Moffa | G08B 29/043 |
| 2013/0297078 A1 * | 11/2013 | Kolavennu | G05D 23/1917 700/276 |
| 2015/0293508 A1 | 10/2015 | Piaskowski et al. | |
| 2017/0090441 A1 | 3/2017 | Schmitt et al. | |

(Continued)

OTHER PUBLICATIONS

U.S. Appl. No. 15/454,562, filed Mar. 9, 2017, Johnson Controls Technology Company.

(Continued)

*Primary Examiner* — Roland J Casillas
(74) *Attorney, Agent, or Firm* — Foley & Lardner LLP

(57) ABSTRACT

A building management system includes a plurality of devices of building equipment and a system manager. The system manager is configured to control the devices of building equipment and generate a user interface. The user interface includes a command widget configured to allow a user to input a first command to control a first device of the plurality of devices of building equipment and an add annotation box configured to allow a user to add an annotation to the command. The system manager is further configured to control the first device in response to the command and store the annotation in an annotation database.

20 Claims, 39 Drawing Sheets

(56) References Cited

U.S. PATENT DOCUMENTS

| | | |
|---|---|---|
| 2017/0212668 A1 | 7/2017 | Shah et al. |
| 2017/0242411 A1 | 8/2017 | Papadopoulos |
| 2017/0242413 A1 | 8/2017 | Piaskowski et al. |
| 2017/0300193 A1 | 10/2017 | Ray et al. |
| 2017/0315697 A1* | 11/2017 | Jacobson ............... G06F 16/26 |
| 2017/0329292 A1 | 11/2017 | Piaskowski et al. |
| 2017/0357490 A1 | 12/2017 | Park et al. |

OTHER PUBLICATIONS

U.S. Appl. No. 15/604,300, filed May 24, 2017, Johnson Controls Technology Company.
U.S. Appl. No. 62/286,273, filed Jan. 22, 2016, Johnson Controls Technology Company.
U.S. Appl. No. 62/324,213, filed Apr. 18, 2016, Johnson Controls Technology Company.
U.S. Appl. No. 62,336,520, filed May 13, 2016, Johnson Controls Technology Company.
U.S. Appl. No. 62/545,073, filed Aug. 14, 2017, Johnson Controls Technology Company.
U.S. Appl. No. 62/485,282, filed Apr. 13, 2017, Johnson Controls Technology Company.
U.S. Appl. No. 62/595,896, filed Dec. 7, 2017, Johnson Controls Technology Company.

* cited by examiner

700

Equipment Data Report

Created On: October 4, 2016 8:48 AM

Created Name: AHU-1

| Label | Short Name | Item Reference | Present Value | Status | Expiration Time |
|---|---|---|---|---|---|
| Discharge Air Temperature | DA-T | jciadx5:NAE-1/FieldBus MSTP1.FAC2612-5.DA-T | 61.3 deg F | Normal | |
| Discharge Air Temperature Setpoint | DA-SP | jciadx5:NAE-1/FieldBus MSTP1.FAC2612-5.DA-SP | 55.0 deg F | Normal | |
| Effective Discharge Air Setpoint | EFFDAT-SP | jciadx5:NAE-1/FieldBus MSTP1.FAC2612-5.EFFDAT-SP | 55.0 deg F | Normal | |
| Discharge Air Static Pressure 1 | DA1-P | jciadx5:NAE-1/FieldBus MSTP1.FAC2612-5.DA1-P | 2.50 in wc | Normal | |
| Duct Static Pressure Setpoint | DAP-SP | jciadx5:NAE-1/FieldBus MSTP1.FAC2612-5.DAP-SP | 1.20 in wc | Normal Overrride | |
| Discharge Air High Duct Pressure | DAPHI-A | jciadx5:NAE-1/FieldBus MSTP1.FAC2612-5.DAPHI-A | Normal | Normal | |
| Outdoor Air Temperature | OA-T | jciadx5:NAE-1/FieldBus MSTP1.FAC2612-5.OA-T | 78.0 deg F | Normal | |
| Preheat Temperature | PH-T | jciadx5:NAE-1/FieldBus MSTP1.FAC2612-5.PH-T | 66.4 deg F | Normal | |
| Mixed Air Temperature | MA-T | jciadx5:NAE-1/FieldBus MSTP1.FAC2612-5.MA-T | 68.2 deg F | Normal | |
| Return Air Temperature | RA-T | jciadx5:NAE-1/FieldBus MSTP1.FAC2612-5.RA-T | 78.3 deg F | Normal | |
| Outdoor Air Hunidity | OA-H | jciadx5:NAE-1/FieldBus MSTP1.FAC2612-5.OA-H | 54.2 %RH | Normal | |
| Return Air Humidity | RA-H | jciadx5:NAE-1/FieldBus MSTP1.FAC2612-5.RA-H | 48.7 %RH | Normal | |
| Supply Fan Status | SF-S | jciadx5:NAE-1/ | On | Normal | |

FIG. 7

Equipment Data Report
Created On: October 4, 2016 8:51 AM
Equipment Definition: VAV Boxes
Space: Floor 1

| Equipment ▼ | Space(s) | ZN-T | ZNT-STATE | EFFHTG-SP | ZN-SP | EFFCLG-SP | WC-ADJ | OCC-MODE | SA-F |
|---|---|---|---|---|---|---|---|---|---|
| VAV-01 | Conference Room | 71.4 deg F | Box Htg | 73.0 deg F | 72.0 deg F | 79.0 deg F | 4.0 deg F | Occupied | 0 cfm |
| VAV-02 | Front Lobby | 88.6 deg F | Prmy Htg | 74 deg F | 72.0 deg F | 78 deg F | 4.0 deg F | Occupied | 0 cfm |
| VAV-03 | Admin Area A | 73.8 deg F | Box Htg | 72.0 deg F | 72.0 deg F | 76.0 deg F | 2.0 deg F | Occupied | 0 cfm |
| VAV-04 | Admin Area B | 74.2 deg F | Box Htg | 74.0 deg F | 72.0 deg F | 78.0 deg F | 4.0 deg F | Occupied | 0 cfm |
| VAV-05 | Cafeteria A | 72.8 deg F | Box Htg | 74.0 deg F | 72.0 deg F | 78.0 deg F | 4.0 deg F | Occupied | 0 cfm |
| VAV-06 | Cafeteria B | 74.9 deg F | Box Htg | 72.0 deg F | 72.0 deg F | 76.0 deg F | 2.0 deg F | Occupied | 0 cfm |
| VAV-07 | Suite A | 74.4 deg F | Box Htg | 74.0 deg F | 72.0 deg F | 78.0 deg F | 4.0 deg F | Occupied | 0 cfm |
| VAV-08 | Suite B | 77.5 deg F | Prmy Htg | 72.0 deg F | 72.0 deg F | 78.0 deg F | 4.0 deg F | Occupied | 0 cfm |
| VAV-09 | Room 01 | 69.3 deg F | Box Htg | 74.0 deg F | 72.0 deg F | 78.0 deg F | 4.0 deg F | Occupied | 0 cfm |
| VAV-10 | Room 02 | 71.1 deg F | Box Htg | 74.0 deg F | 72.0 deg F | 78.0 deg F | 4.0 deg F | Occupied | 0 cfm |
| VAV-11 | Room 03 | 71.9 deg F | Box Htg | 74.0 deg F | 72.0 deg F | 78.0 deg F | 4.0 deg F | Occupied | 0 cfm |
| VAV-12 | Room 04 | 73.8 deg F | Box Htg | 74.0 deg F | 72.0 deg F | 78.0 deg F | 4.0 deg F | Occupied | 0 cfm |
| VAV-13 | Room 05 | 70.2 deg F | Box Htg | 74.0 deg F | 72.0 deg F | 78.0 deg F | 4.0 deg F | Occupied | 0 cfm |
| VAV-14 | Team Room | | Box Htg | 74.0 deg F | 72.0 deg F | 78.0 deg F | 4.0 deg F | Occupied | 0 cfm |

Binding Panel

| Alias | Explicit |
|---|---|
| ⌄ Aliased points for AHU | |
| OA-T | |
| SHDWN-C | |
| VMODE | |
| OCC-C | |
| MA-T | |
| DA-T | |
| ZN-T | |
| RA-T | |
| START | |
| STOP | |
| SF-S | |
| SF-C | |
| SMKDPR-S | |
| LT-ALM | |
| SMK-ALM | |
| MA-DPR | |
| HTG-VLV | |
| CLG-VLV | |
| SMKDPR-C | |
| CLOA-SP | |
| DBSWOV-SP | |
| MALL-SP | |

Equipment Definition

| Short Name |
|---|
| OA-T |
| SHDWN-C |
| VMODE |
| OCC-C |
| MA-T |
| DA-T |
| ZN-T |
| RA-T |
| START |
| STOP |
| SF-S |
| SF-C |
| SMKDPR-S |
| LT-ALM |
| SMK-ALM |
| MA-DPR |
| HTG-VLV |
| CLG-VLV |
| SMKDPR-C |
| CLOA-SP |
| DBSWOV-SP |
| MALL-SP |
| PHOA-SP |
| ZNT-SP |
| DSP-CALC |

FIG. 33

BUILDING MANAGEMENT SYSTEM USER INTERFACES

CROSS-REFERENCE TO RELATED APPLICATION

This application claims the benefit of and priority to U.S. Provisional Patent Application No. 62/446,284 filed Jan. 13, 2017, the entire disclosure of which is incorporated by reference herein.

BACKGROUND

The present disclosure relates generally to the field of building management systems. A building management system (BMS) is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

SUMMARY

One implementation of the present disclosure is a building management system. The building management system includes a plurality of devices of building equipment and a system manager. The system manager is configured to control the devices of building equipment and generate a user interface. The user interface includes a command widget configured to allow a user to input a first command to control a first device of the plurality of devices of building equipment and an add annotation box configured to allow a user to add an annotation to the command. The system manager is further configured to control the first device in response to the command and store the annotation in an annotation database.

In some embodiments, the annotation database comprises a plurality of command annotations. The system manager is further configured to generate a report comprising the annotation and the plurality of command annotations. In some embodiments, the system manager is further configured to store an identifier of the first device and a description of the first command with the annotation in the annotation database.

In some embodiments, the annotation database comprises a plurality of command annotations. A portion of the plurality of command annotations are stored with the identifier of the first device. The system manager is further configured to generate a report corresponding to the first device comprising the annotation and the portion of the plurality of command annotations stored with the identifier of the first device.

In some embodiments, the annotation database further comprises a plurality of no-annotation indications corresponding to additional commands for which no annotation was entered in the add annotation box. The system manager is further configured to generate a report comprising the plurality of no-annotation indications.

In some embodiments, the add annotation box allows the user to add the annotation by inputting text to the add annotation box. In some embodiments, the add annotation box allows the user to select the annotation from a predetermined list of possible annotations.

Another implementation of the present disclosure is building management system. The building management system includes a plurality of devices of a type of building equipment and a system manager. The system manager is configured to store an equipment definition. The equipment definition includes characteristics of the type of building equipment. The system manager is also configured to associate an aliased graphic with the equipment definition. The aliased graphic graphically represents a device of the type of building equipment. The system manager is also configured to generate a graphical user interface that displays an instance of the aliased graphic for each of the plurality of devices. In some embodiments, the graphical user interface also includes an aliased graphic assignment module that allows a user to assign an aliased graphic to an equipment type.

In some embodiments, a portion of the plurality of devices have an exceptional characteristic that differentiates the portion of the plurality of devices from a remainder of the plurality of devices. The system manager is further configured to associate an exception graphic with the portion of the plurality of devices having the exceptional characteristic and replace, on the graphical user interface, the instance of the aliased graphic with an instance of the exception graphic for each device in the portion of the plurality of devices having the exceptional characteristic. The exception graphic includes a graphical representation of the exceptional characteristic. In some embodiments, the graphical user interface further comprising an exception graphic assignment module that allows a user to assign exception graphics to one or more of the plurality of devices.

In some embodiments, each device includes present components from a set of possible components for the type of building equipment. Each component is configured to provide data corresponding to a component point type to the system manager. The aliased graphic includes a graphical representation of each possible component. The system manager is further configured, for each device of the plurality of devices, to receive data corresponding to the component point types, determine the present components based on the component point types of the received data, and show the graphical representations of the present components in the instance of the aliased graphic for the device and hide the graphical representations of non-present components in the instance of the aliased graphic for the device in the graphical user interface.

In some embodiments, the system manager is further configured to provide a graphics creation module configured to allow the user to create a new graphic and assign the new graphic as the aliased graphic.

Another implementation of the present disclosure is a building management system. The building management system includes building equipment corresponding to a plurality of spaces and operable to provide data corresponding to points and a graphics manager. The graphics manager is configured to generate a user interface that includes a status summary widget and a binding interface. The binding interface is configured to allow a user to request to bind status the status summary widget to a selected space of the plurality of spaces. The graphics manager is further configured to, in response to a user request to bind the status summary widget to the selected space of the plurality of spaces, determine relevant points corresponding to the selected space, receive relevant data corresponding to the relevant points, and provide metrics based on the relevant data in the status summary widget.

In some embodiments, the building equipment includes a first set of devices corresponding to the selected space. The graphics manager is configured to determine the relevant points corresponding to the selected space by identifying the first set of devices and determining the relevant points as points corresponding to the first set of devices.

In some embodiments, each point has a point type. The binding interface is further configured to allow a user to input a point type filter identifying a selected point type. The relevant points are determined as points corresponding to the selected space and having the selected point type. In some embodiments, the binding interface allows a user to input a point type filter by providing an entry blank configured to accept a point short name that corresponds to the selected point type.

In some embodiments, the plurality of spaces includes one or more child spaces of the selected space. The binding interface is further configured to provide an option for the user to request to include the one or more child spaces with the selected space. The graphics manager is further configured to, in response to a user request to include the one or more child spaces with the selected space, determine the relevant points as points corresponding to the selected space and points corresponding to the one or more child spaces.

In some embodiments, the metrics include an alarm count determined as a count of relevant points in an alarm status, a warning count determined as a count of relevant points in a warning status, an offline count determined as a count of relevant points in an offline status, and a value inaccessible count determined as a count of relevant points in a value inaccessible status. In some embodiments, the graphics manager is further configured to receive updated data corresponding to the relevant points and update the metrics to include the updated data.

BRIEF DESCRIPTION OF THE DRAWINGS

FIGS. 7-8 are equipment data reports which can be generated by the BMS of FIG. 4, according to some embodiments.

FIG. 32 is a drawing of a binding panel which can be used by the graphics manager, according to some embodiments.

FIG. 33 is a drawing of an equipment definition which can be used by the graphics manager, according to some embodiments.

DETAILED DESCRIPTION

Building Management System and HVAC System

Figure 1:
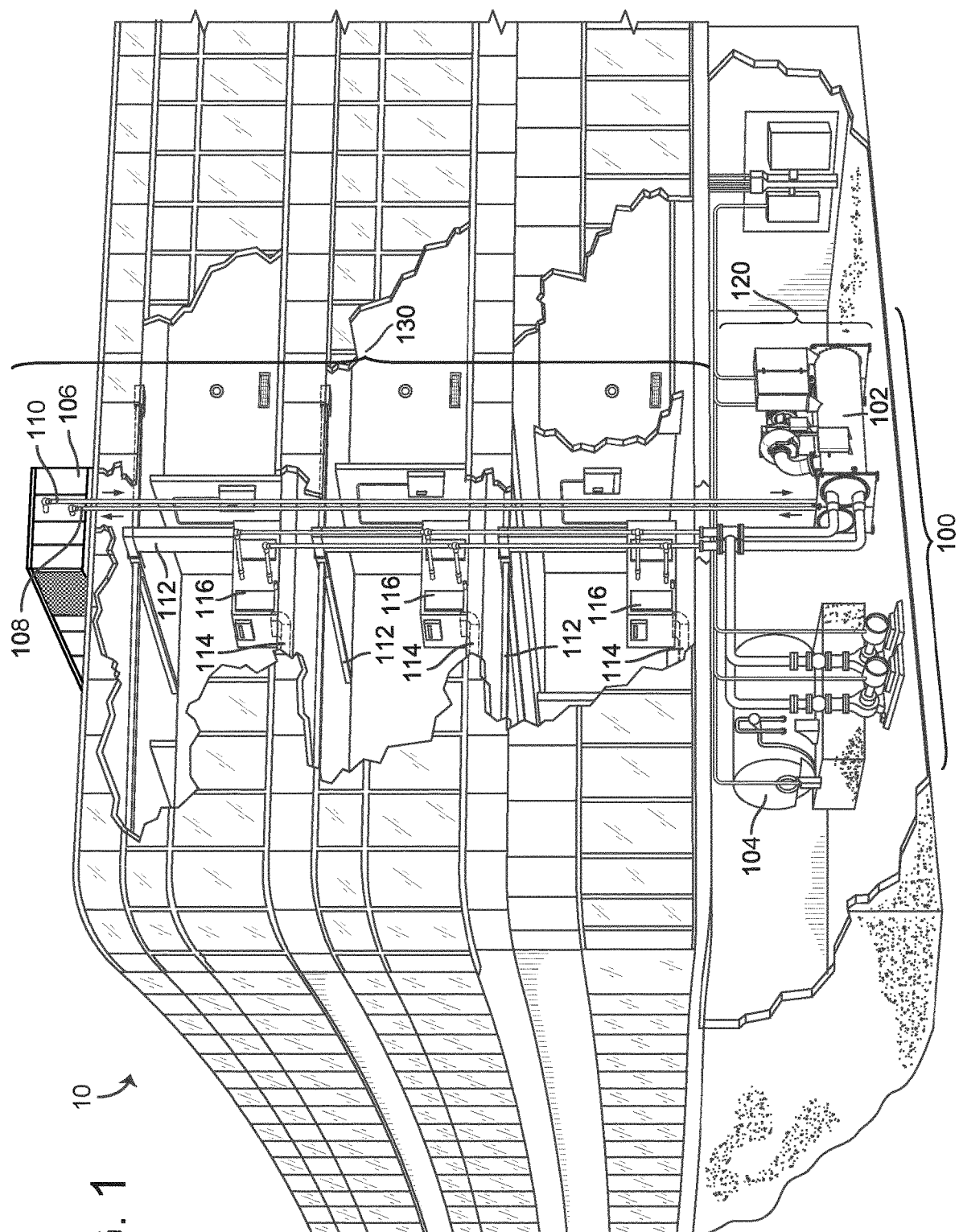
FIG. 1 is a drawing of a building equipped with a building management system (BMS) and a HVAC system, according to some embodiments.

Referring to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
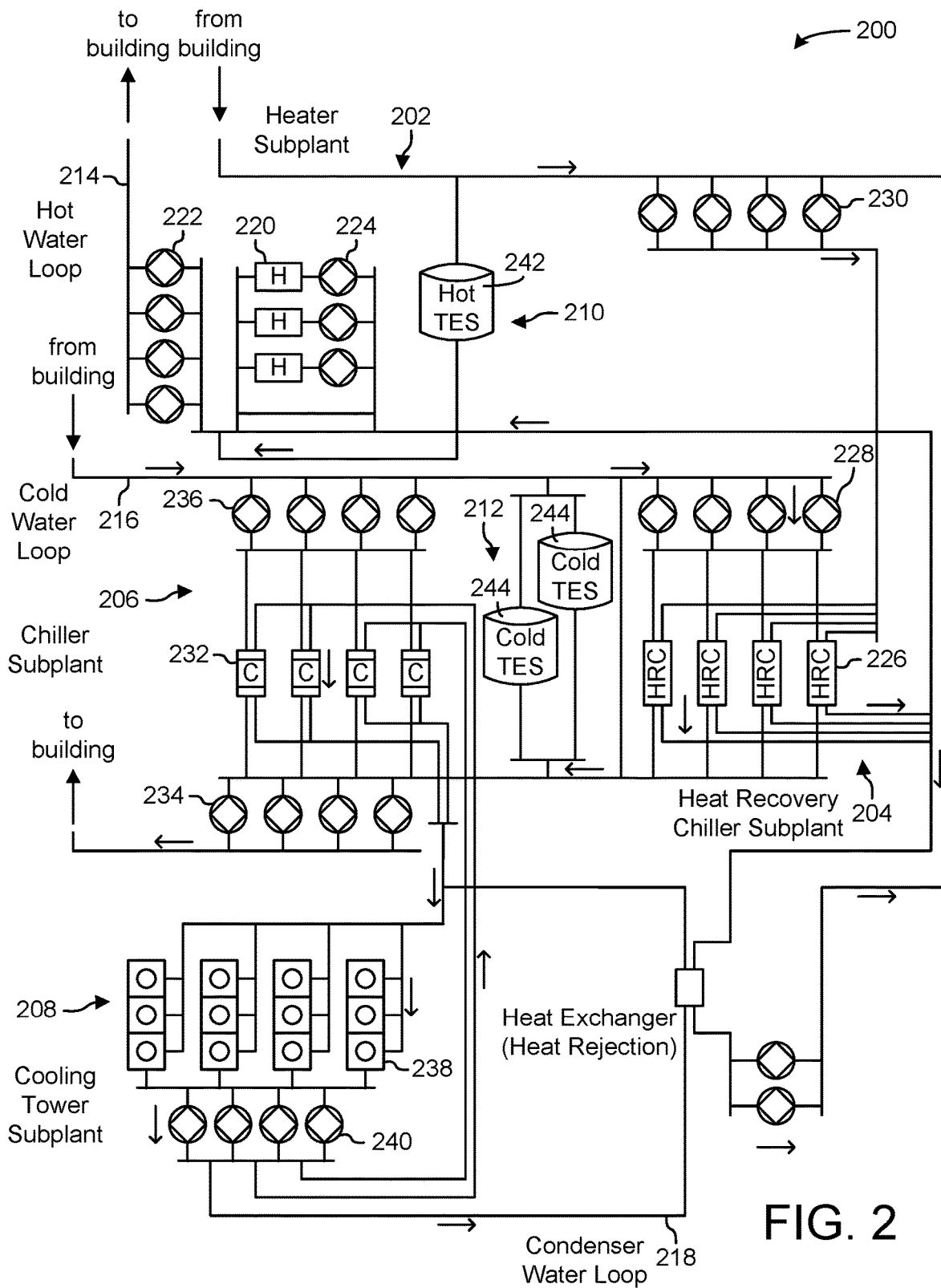
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
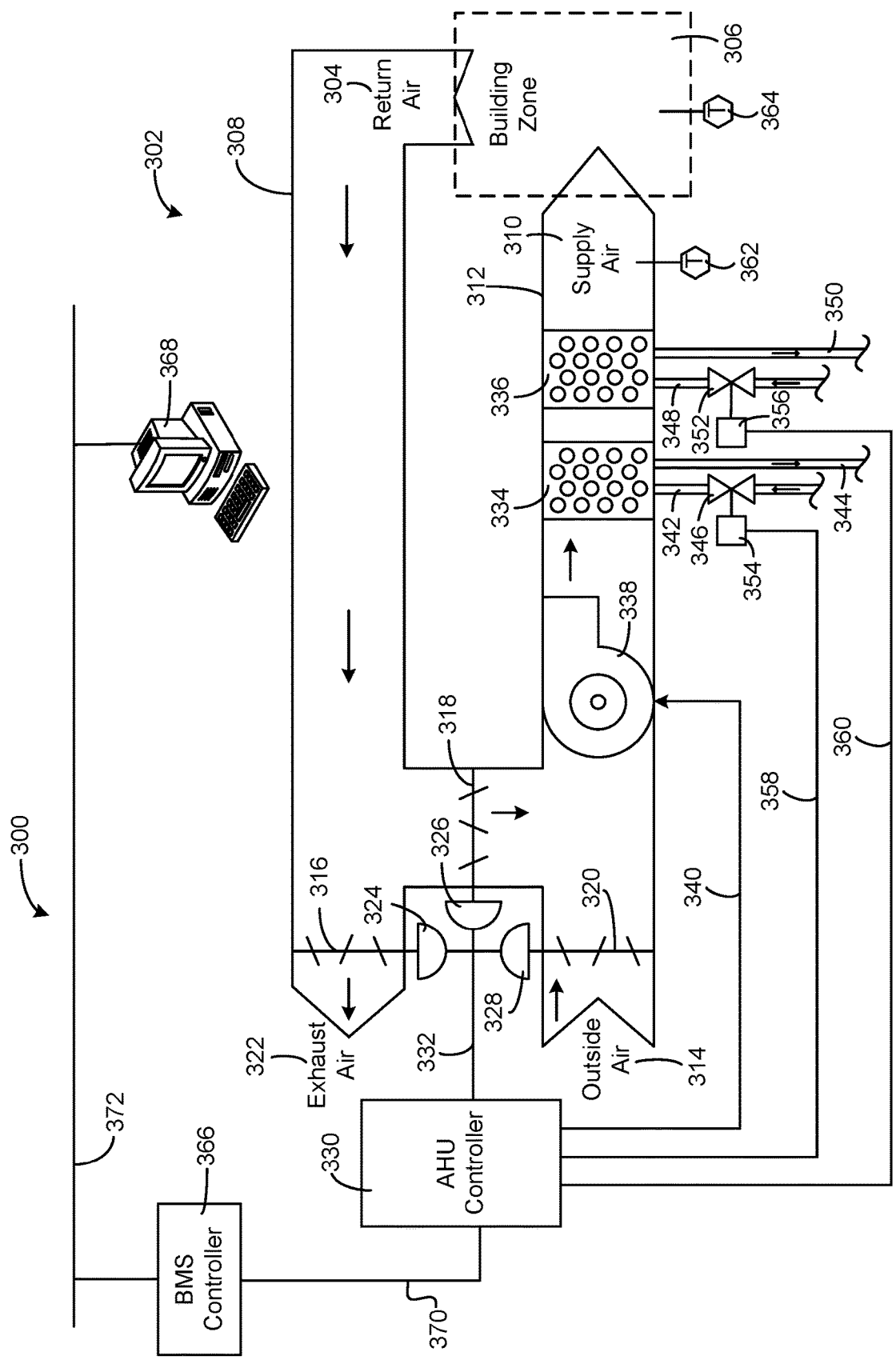
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
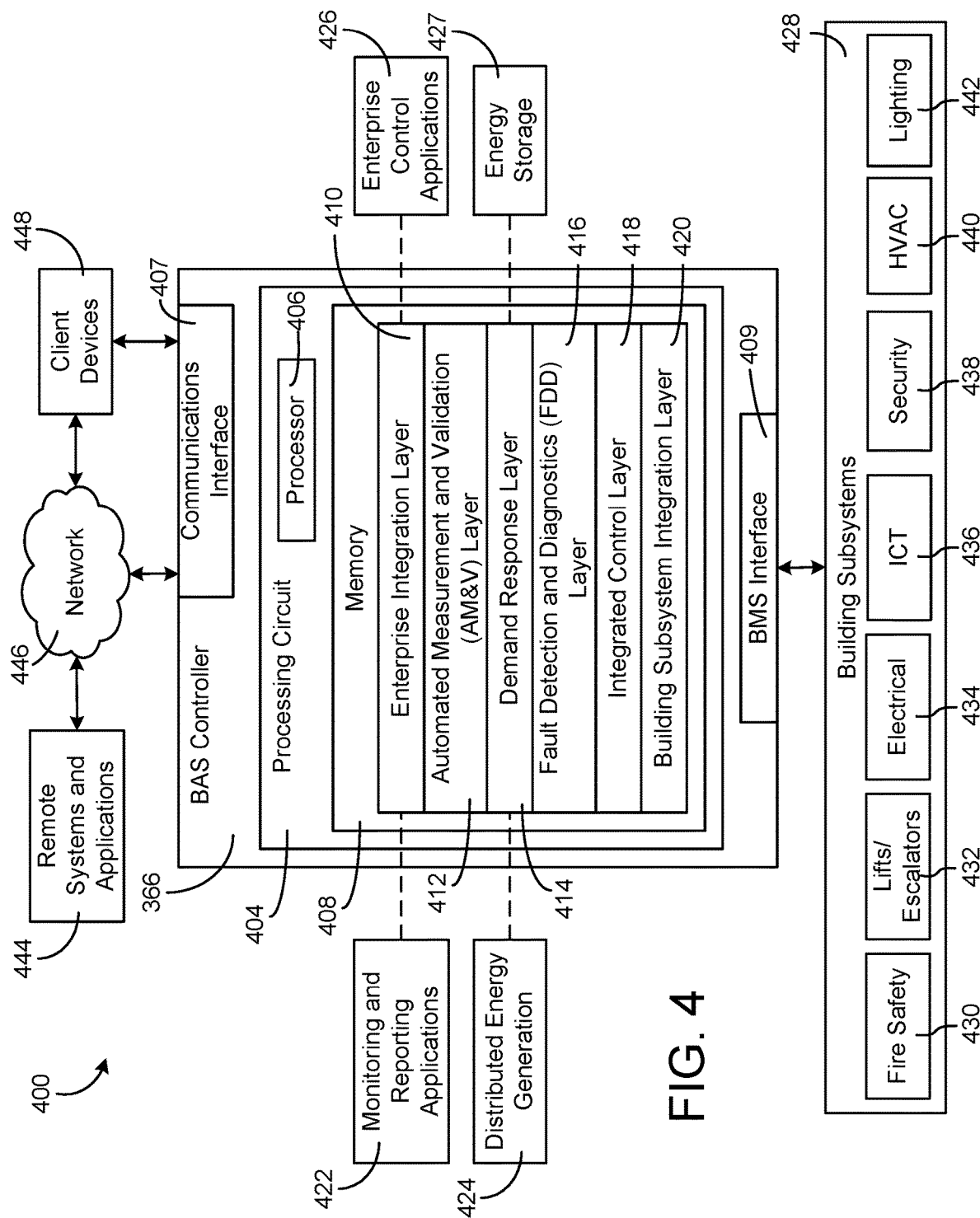
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

Graphical User Interfaces and Graphics

Referring now to FIGS. 5-44, various graphical user interfaces (GUI) and graphics provided by BMS 400 are shown according to various exemplary embodiments. The GUIs and graphics described herein may be provided in combination with any of the GUIs or graphics described in U.S. Provisional Patent Application No. 62/324,213 filed Apr. 18, 2016, or U.S. Provisional Patent Application No. 62/336,520 filed May 13, 2016, both of which are incorporated by reference herein in their entireties. In some embodiments, the GUIs and graphics are generated based on equipment definitions described in U.S. patent application Ser. No. 14/251,414 filed Apr. 11, 2014, the entire disclosure of which is incorporated by reference herein.

In one embodiment, BMS 400 generates the GUIs using a web-server and presents the GUIs in a web-page format (e.g., HTML5). The graphical user interfaces can be viewed via any web browser. Alternatively, BMS 400 may include a dedicated device running software associated with the graphical user interface. Where the GUIs are generated using a web-server, the graphics, as well as the associated user interfaces may not require any software or plugin to be installed on a client device. Example client devices can include smart phones (e.g., Apple iPhone, Android phones, Microsoft Windows phones, etc.), tablets (e.g. iPad, Android tablets, Microsoft Surface), laptop computers, stationary computers such as workstations or PCs, or specialized monitoring equipment, such as commissioning tools or other dedicated BMS interface devices. In one embodiment, BMS 400 provides the same GUIs to each client device, regardless of the client device type. In other embodiments, BMS 400 provides different GUIs to different types of client devices.

Interface Updates

Figure 5:
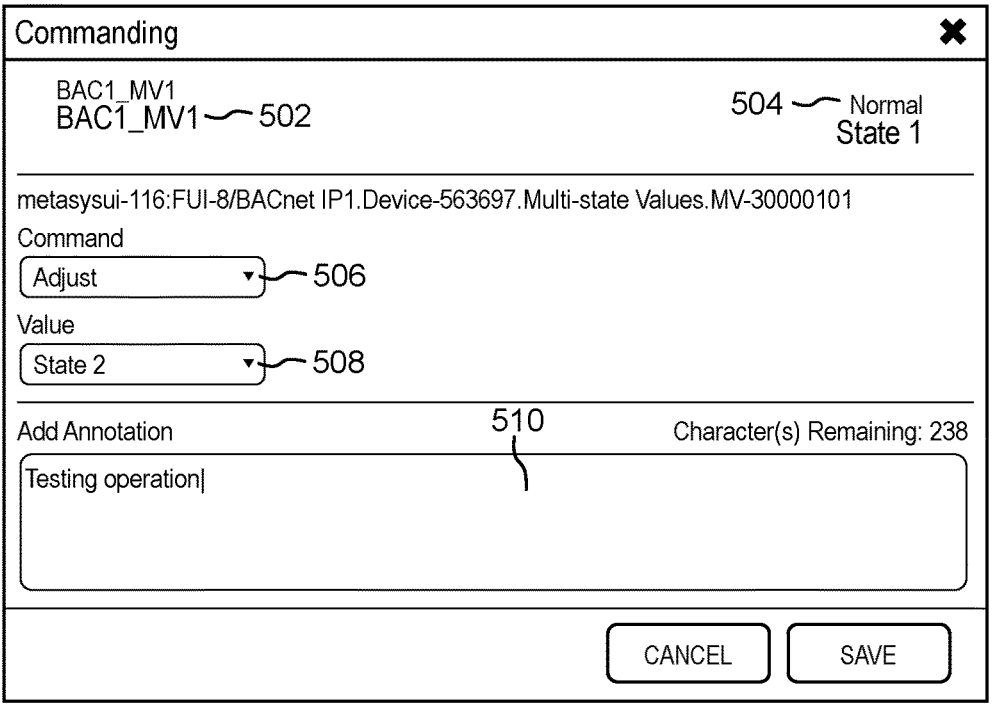
FIG. 5 is a drawing of a point commanding interface which can be generated by the BMS of FIG. 4, according to some embodiments.

Referring particularly to FIG. 5, a point commanding interface 500 is shown, according to an exemplary embodiment. Point commanding interface 500 can be used to manually adjust or otherwise command the value of a point and may be displayed in response to a user selecting the point in BMS 400. Interface 500 is shown to include a point name 502 and a current value 504 of the point. A user can specify a command to apply to the point via command dropdown 506. If the command is a command to adjust the value of a point, interface 500 may include a value selector 508. Because the selected data point is a multistate value point, value selector 508 is shown as a dropdown menu which allows the user to select one of a set of multistate values. However, if the point is an analog point or other type of point, value selector 508 may be provided as a text box, toggle switch, slider, or other type of adjustable input which allows a user to specify a particular value.

Point commanding interface 500 is shown to include an annotation text box 510. Annotation text box 510 allows a user to enter a short note when commanding a point. The note can explain why the command was made or provide other user comments. In some embodiments, annotation text box 510 is provided to users who have the "Manage Audit History" system access permission. The note can be viewed in an equipment activity widget for a device associated with the point and/or via a rollup report of notes. In some embodiments, the notes are stored in an annotation database.

Figure 6:
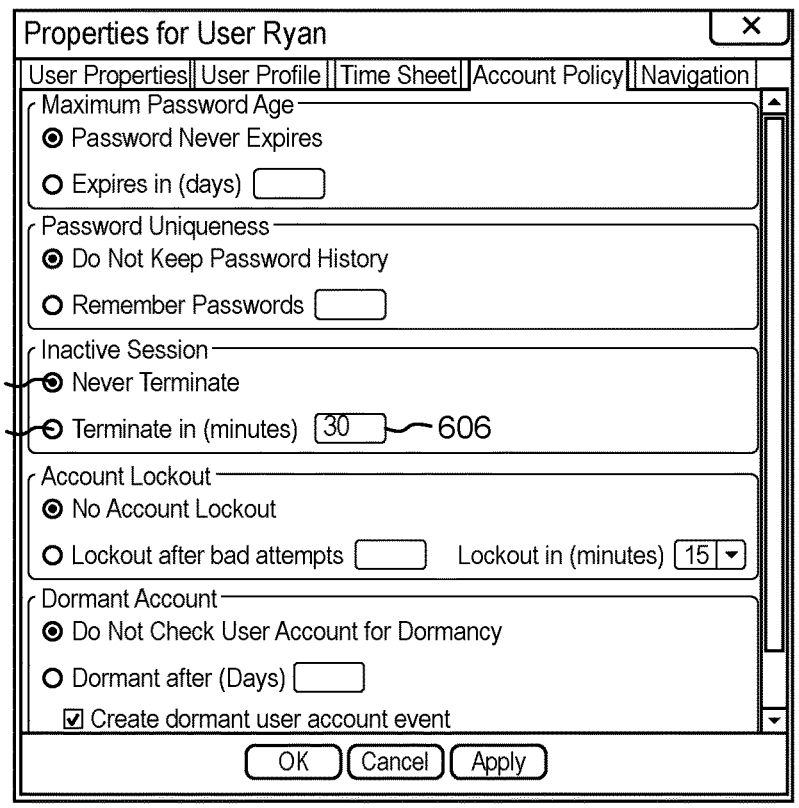
FIG. 6 is a drawing of a user properties interface which can be generated by the BMS of FIG. 4, according to some embodiments.

Referring now to FIG. 6, a user properties interface 600 is shown, according to an exemplary embodiment. User properties interface 600 allows a user to specify various user properties, profile attributes, roles, time sheet attributes, account policies, or other information associated with the user. In some embodiments, user properties interface 600 includes an option for specifying the user's inactivity session timeout. For example, the user can select the "never terminate" radio button 602 to specify that the session will never terminate due to inactivity. Alternatively, the user can select the "terminate in" radio button 604 and input a number of minutes 606 to specify that the user session will terminate after the number of minutes 606. BMS 400 may monitor user activity for any type of user device including phones and tablets, provided that the phones or tablets do not lose connection to BMS 400 or go to sleep.

Referring now to FIGS. 7-8, equipment data reports 700 and 800 which can be generated by BMS 400 are shown, according to an exemplary embodiment. Equipment data report 700 is an example of a report which can be generated for a particular device (i.e., AHU-1), whereas equipment data report 800 is an example of a report which can be generated for a set of multiple devices (i.e., VAV boxes). The set of multiple devices can be defined based on an equipment definition attribute or other attribute of the devices (e.g., location, device type, etc.). Equipment data reports 700-800 and equipment summary widgets can be exported to PDF or any other output format.

Figures 9, 10:
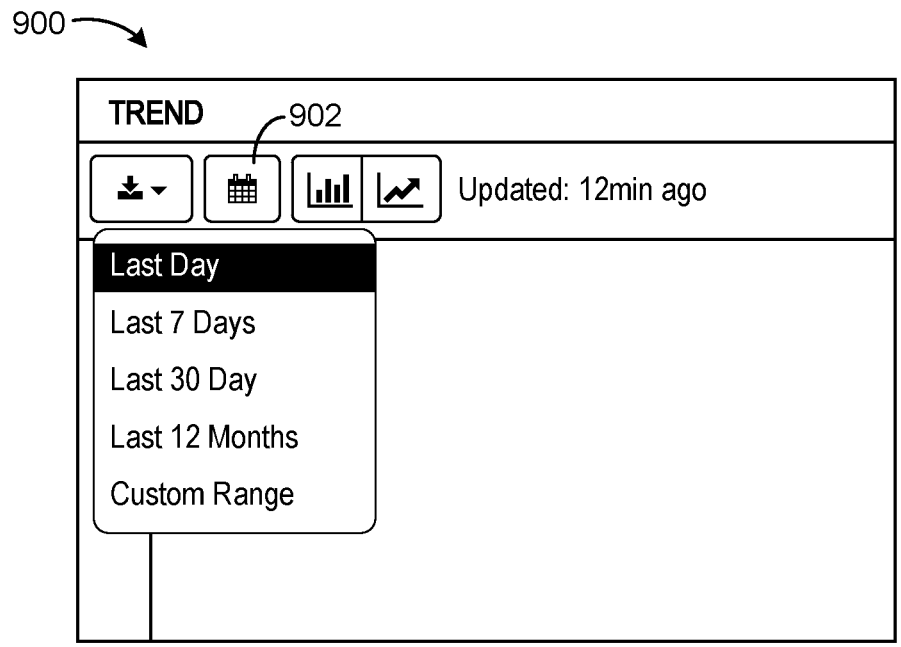
FIG. 9 is a drawing of a trend viewer interface which can be generated by the BMS of FIG. 4, according to some embodiments.
FIG. 10 is a drawing of an alarm manager interface which can be generated by the BMS of FIG. 4, according to some embodiments.

Referring now to FIG. 9, a trend viewer interface 900 is shown, according to an exemplary embodiment. Trend viewer interface 900 can provide trend data for one or more selected systems or pieces of equipment in BMS 400. The trend data can include real-time data from BMS 400, historical data, or a combination of historical data and real-time data. Trend viewer interface 900 may allow a user to select any number of points (e.g., up to ten points on desktop platforms and up to four points on a tablet or phone. In some embodiments, trend viewer interface 900 includes a date selector 902 which allows a user to specify a particular time range of data to display. For example, the user can select data from the last day, the last 7 days, the last 30 days, the last 12 months, or specify a custom time range.

Referring now to FIG. 10, an alarm manager interface 1000 is shown, according to an exemplary embodiment. Alarm manager interface 1000 may display various parameters associated with alarms that are monitored by BMS 400. For example, alarm manager interface 1000 can display the alarm name 1002, the alarm priority 1004, the alarm type 1006, the equipment 1008 or space 1010 associated with the alarm, a high alarm limit 1012, a low alarm limit 1014, a trigger value 1016, and a time or date at which the alarm occurred 1018. In some embodiments, alarm monitor states and spaces authorization data are archived when BMS 400 is upgraded.

Figure 11:
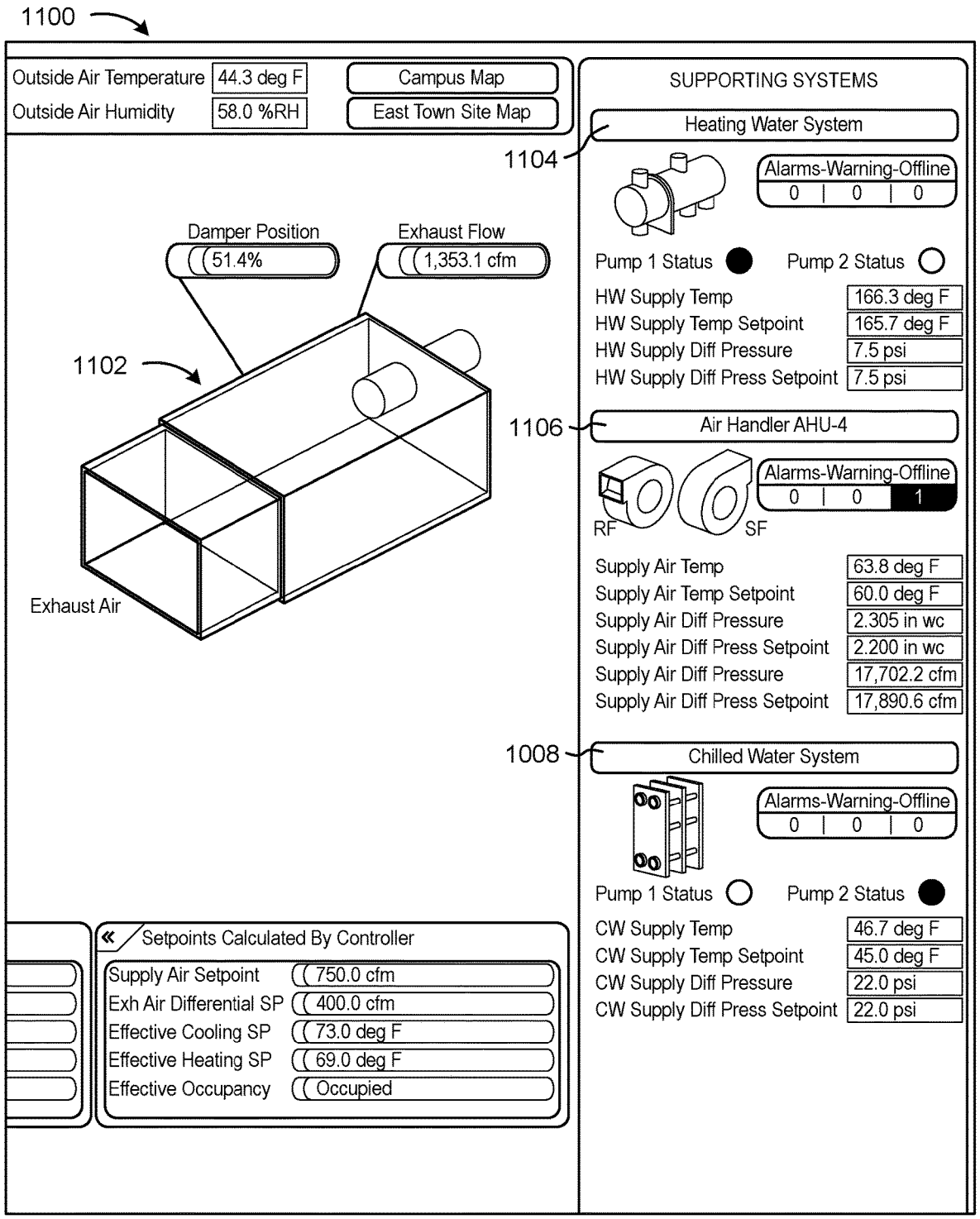
FIGS. 11-13 are drawings of a graphics package which can be provided by the BMS of FIG. 4, according to some embodiments.
Figure 12:
Figure 13:
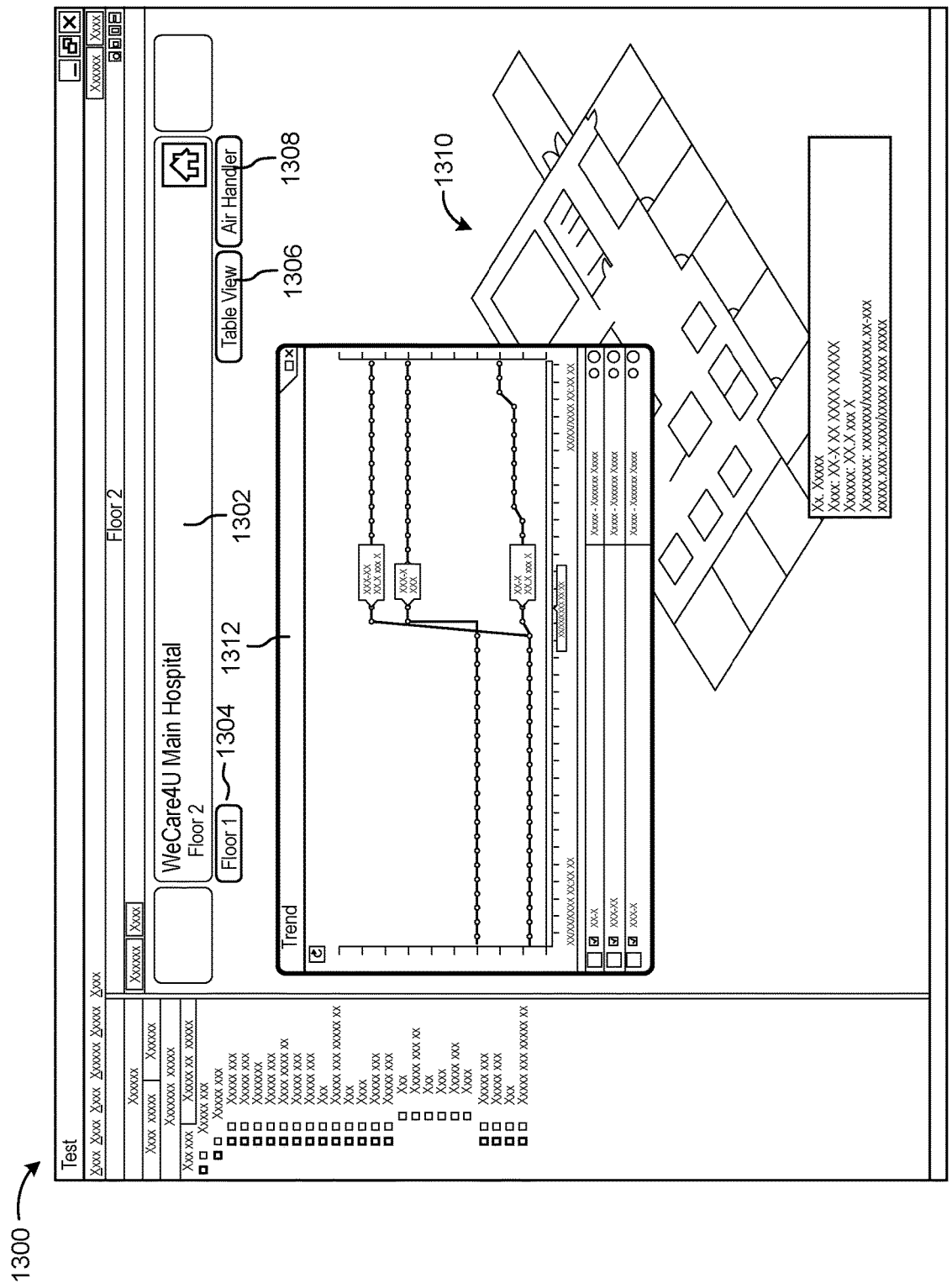

Referring now to FIGS. 11-13, several interfaces 1100, 1200, and 1300 illustrating a graphics package provided by BMS 400 are shown, according to an exemplary embodiment. Graphics play a key role in the usability of BMS 400. The graphics package provided by BMS 400 may provide product differentiation, reduce labor to build graphics, and reduce the number of tools required for new jobs. Interface 1100 is an example of graphics that show equipment relations. For example, interface 1100 is shown to include a damper graphic 1102 which corresponds to a particular damper in BMS 400. Interface 1100 is shown to include a list of supporting systems associated with the damper. For example, the airflow through the damper may be caused by an air handler 1106, heated by a heating water system 1104, and cooled by a chilled water system 1008. The list of supporting systems may identify some or all of the systems which affect the equipment shown in interface 1102.

Interface 1200 is an example of graphics that provide user friendly navigation. Interface 1200 is shown to include a list of spaces 1202. The list of spaces 1202 may include selectable buttons for each set of spaces and an indication of the rooms or zones located in each space. For example, the space "Lower Level North" is shown to include the rooms G0103, G0105-G0109, G0111, G0113-G0117, G0119-G0123, G0205A-G0205H, G0350-G0357, G0403-G0421, G0423-G0432, and G0437. Other spaces in the list of spaces 1202 may also indicate the rooms or zones within each space. A user can click any of the selectable buttons in interface 1200 to navigate to a more focused interface for the selected space.

Interface 1300 is an example of various features and graphics that can be included in the GUI. Interface 1300 is shown to include title bars and heaters 1302 which display information associated with a particular space or piece of equipment. Interface 1300 may include a space navigation button 1304, a table view navigation button 1306, and an equipment navigation button 1308. Space navigation button 1304 may allow a user to navigate to other spaces. Table view navigation button 1306 may allow the user to navigate to tabular summaries via the equipment summary widget. Equipment navigation button 1308 may allow the user to navigate to equipment serving the space.

In some embodiments, interface 1300 includes a potential problem areas widget 1310 and a trend widget 1312. Potential problem areas widget 1310 may include a floorplan or other representation of a space. The floorplan may highlight certain areas (e.g., rooms, zones, pieces of equipment, etc.) which may be problem areas. In some embodiments, the areas highlighted in potential problem areas widget 1310 are based on alarms or faults detected in the areas. Trend widget 1312 may display historical trend data for one or more points associated with a space or piece of equipment. Advantageously, interface 1300 facilitates the presentation of information on mobile devices by reducing content in the graphics.

Graphics Manager

In some embodiments, BMS 400 includes a graphics manager. The graphics manager can be used to create and edit graphics, and associate the graphics with equipment and/or spaces. Graphics can be created, edited, and managed in either online or offline operating modes and may conform to industry standards vs. vendor specific capabilities. In brief overview, the graphics manager may allow a user to create a master layer which can be displayed in the background of multiple GUIs, hide and show symbols, snap components when creating graphics, automatically bind graphics to various equipment and spaces, import/export graphics, and find/replace attributes of the graphics or the equipment and spaces associated therewith.

The types of graphics which can be created, edited, and managed by the graphics manager include space graphics, alias graphics, and exception graphics. Space graphics may include floorplans, campus dashboards, or other graphics which represent spaces. Alias graphics may include equipment graphics that apply to particular types of equipment based on an attribute of the equipment definition associated with the equipment. Exception graphics may be exceptions to alias graphics and can be specified for individual pieces of equipment that would otherwise be associated with an alias graphic. For example, consider a site that has multiple AHUs. Some of the AHUs may have outdoor air ductwork whereas other of the AHUs may not have outdoor air ductwork. An alias graphic can be created and linked to the AHUs with outdoor air ductwork. An exception graphic can be created and linked to the AHUs without outdoor air ductwork.

The graphics manager can be configured to bind graphics to various spaces, equipment, or equipment definitions. For example, alias graphics can be bound to a particular equipment definition. An alias graphic binding may reference both the equipment definition a name of a point in the equipment definition. The alias graphic may then be automatically selected and provided for any equipment having the equipment definition to which the alias graphic is bound. Explicit bindings can also be used by the graphics manager. An explicit binding may include a fully qualified reference (FQR) to a piece of equipment and a reference to a name of the point in the equipment definition. A FQR binding may include a fully qualified reference to a point in BMS 400.

The graphics manager may be the starting point in the graphics creation workflow. In some embodiments, the graphics manager allows a user to create, edit, delete, and associate graphics with a space, equipment, or equipment definition. The graphics manager can also be used to create, edit, or delete user defined graphics templates and edit the master layer. Graphics can be imported to the graphics manager and exported from the graphics manager. The types of graphics that can be imported and exported may include space and equipment graphics, user defined templates, and the master layer.

Figure 14:
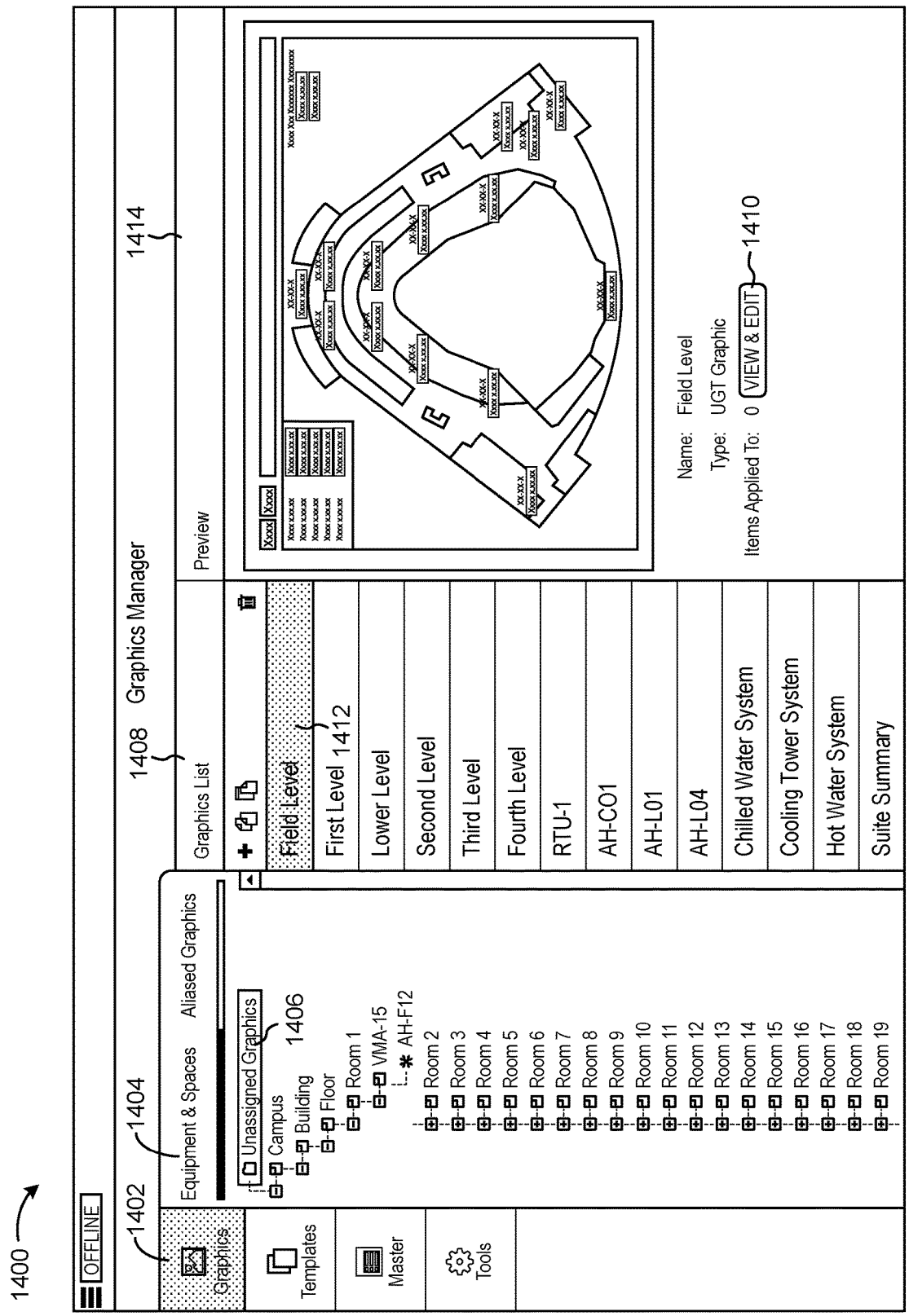
FIG. 14 is a drawing of a graphics manager interface which can be generated by the BMS of FIG. 4, according to some embodiments.
Figure 15:
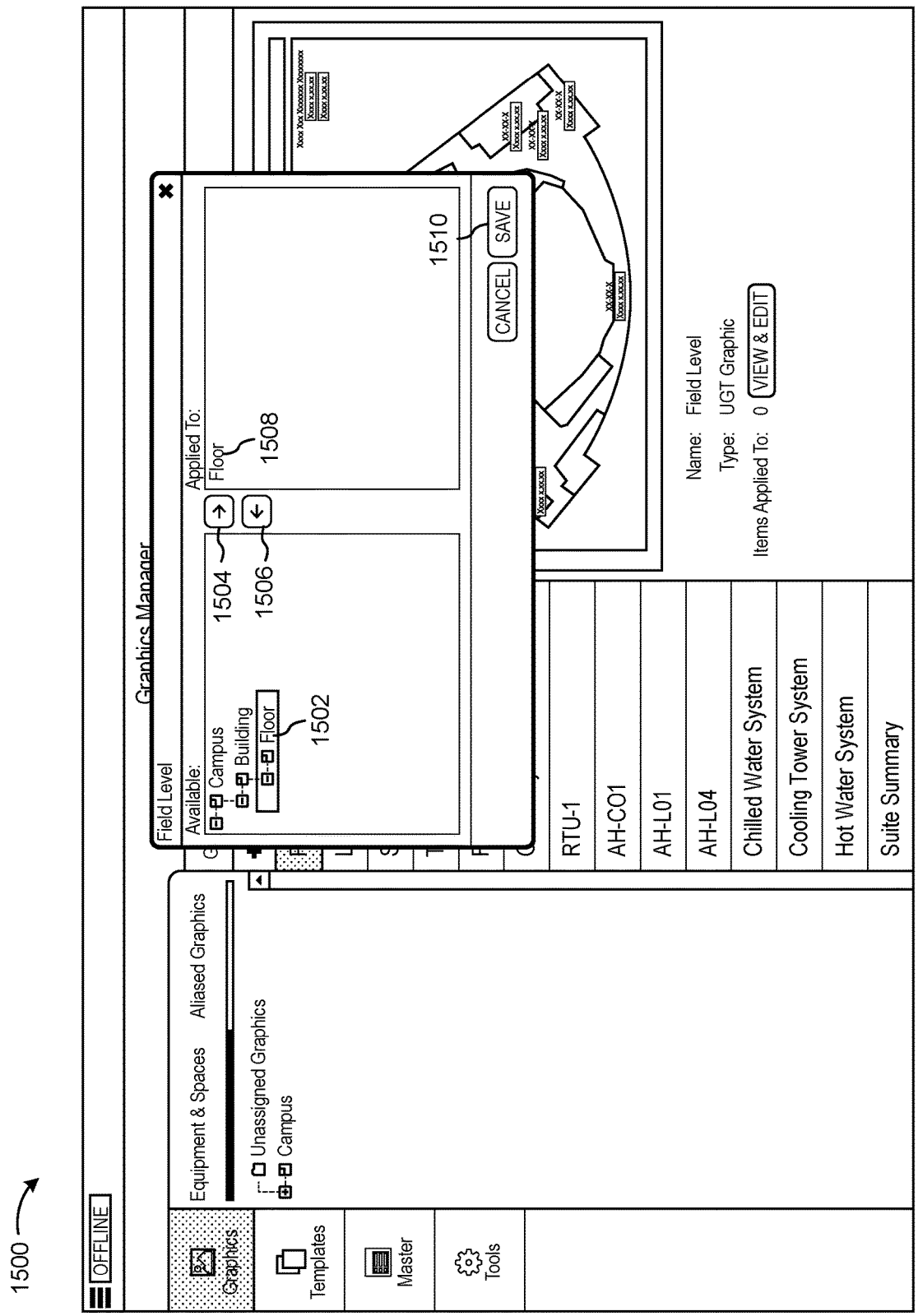
FIG. 15 is a drawing of an interface which can be used to assign a graphic to a space or piece of equipment, according to some embodiments.
Figure 16:
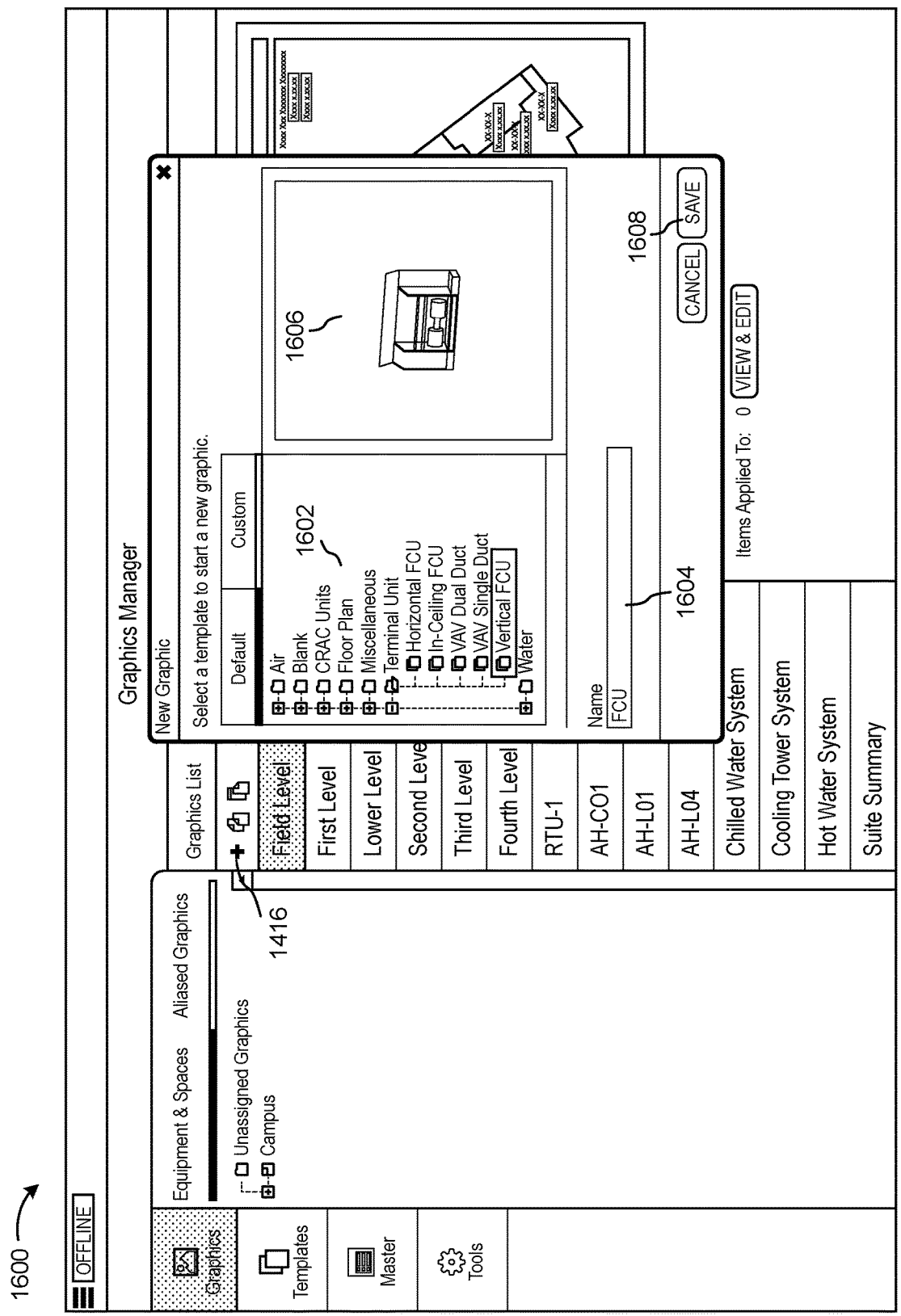
FIG. 16 is a drawing of an interface which can be used to create new graphics without assigning the graphic to a space/equipment, according to some embodiments.

Referring now to FIGS. 14-16, several interfaces 1400-1600 of the graphics manager are shown, according to an exemplary embodiment. Interface 1400 is shown to include a graphics tab 1402. Graphics tab 1402 can be used to create and assign built-in graphics to either a space or piece of equipment. Graphics tab 1402 may include an equipment & spaces tree 1404 which includes a list of unassigned graphics 1406. Unassigned graphics 1406 can be assigned to spaces or equipment. Graphics tab 1402 can be used to copy, paste, and/or delete space or equipment graphics as well as aliased graphics. For example, selecting unassigned graphics 1406 in graphics tab 1402 may cause interface 1400 to display a graphics list 1408. Any of the graphics in graphics list 1408 can be selected and assigned to a space or piece of equipment. For example, selecting the field level graphic 1412 may cause a preview 1414 of the field level graphic 1412 to be displayed. A user can click the view and edit button 1410 to view and edit the spaces or equipment to which the field level graphic 1412 is assigned.

Interface 1500 is an example of an interface which can be used to assign a graphic to a space or piece of equipment. In some embodiments, interface 1500 is displayed when a user clicks the view and edit button 1410 in interface 1400.

Interface 1500 is shown to include a tree 1502 of available spaces/equipment to which a graphic can be assigned. The user can select one or more of the available spaces/equipment and in tree 1502 and click button 1504 to add the selected space/equipment to the "applied to" list 1508. For example, the space "Floor" can be selected and added to list 1508 by clicking button 1504 or removed from list 1508 by clicking button 1506. After the desired spaces/equipment are shown in list 1508, the user can assign the graphic by clicking save button 1510. Once a graphic has been assigned to a particular space/equipment, the graphic may be displayed in graphics list 1408 when the equipment/space is selected in equipment & spaces tree 1404.

Interface 1600 is an example of an interface which can be used to create new graphics without assigning the graphic to a space/equipment. Interface 1600 can be used to copy and paste graphics as well as delete graphics. In some embodiments, interface 1600 is displayed when a user clicks the new graphics button 1416, shown as a plus icon in interface 1400. Interface 1600 is shown to include a list of graphic templates 1602 which can be used as a starting point for creating a new graphic. A user can select one of the graphic templates 1602 or a custom graphic and give the new a graphic a name 1604. A preview 1606 of the new graphic may be displayed in interface 1600. In some embodiments, interface 1600 allows a user to edit the graphic template. After any desired edits have been made, the user can create the new graphic by clicking the create button 1608. Once the graphic has been created, the new graphic may be displayed in graphics list 1408.

Figures 17, 18:
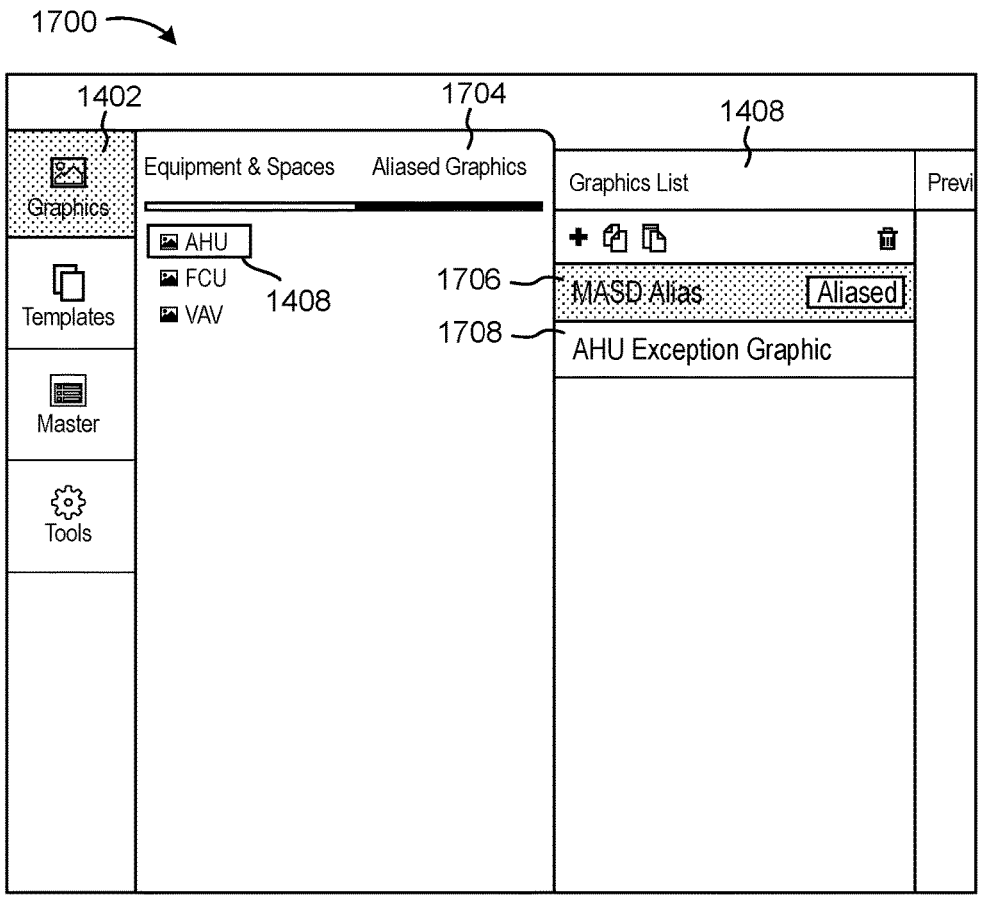
FIG. 17 is a drawing of an interface for creating aliased graphics, according to some embodiments.
FIG. 18 is a drawing of an equipment definition associated with an aliased graphic, according to some embodiments.

Referring now to FIGS. 17-18, an interface 1700 for creating aliased graphics is shown, according to an exemplary embodiment. Interface 1700 may be displayed when a user selects aliased graphics tab 1704 in interface 1400. Aliasing allows a single graphic to be used by many pieces of equipment that have a common attribute. In some embodiments, aliasing makes use of the equipment definition for an equipment type. For example, aliased graphics tab 1704 is shown to include several equipment definitions 1702. A graphic can be assigned to one or more of equipment definitions 1702 and used for all equipment that use the assigned equipment definitions to which the graphic is assigned.

In some embodiments, selecting an equipment definition 1702 causes interface 1700 to display an aliased graphic 1706 for the selected equipment definition. The aliased graphic 1706 may also be referenced in the equipment definition. For example, interface 1800 (shown in FIG. 18) illustrates an example equipment definition with a reference 1802 to a particular aliased graphic. When a graphic is added to an equipment definition, the graphics manager may automatically map the graphic to the equipment definition. An exception graphic 1708 may also be displayed in interface 1700. Exception graphic 1708 may be displayed in graphics list 1408 to allow a user to manage both aliased graphic 1706 and exception graphic 1708 together (e.g., if a subset of equipment need to have the same exception graphic 1708).

Figures 19, 20:
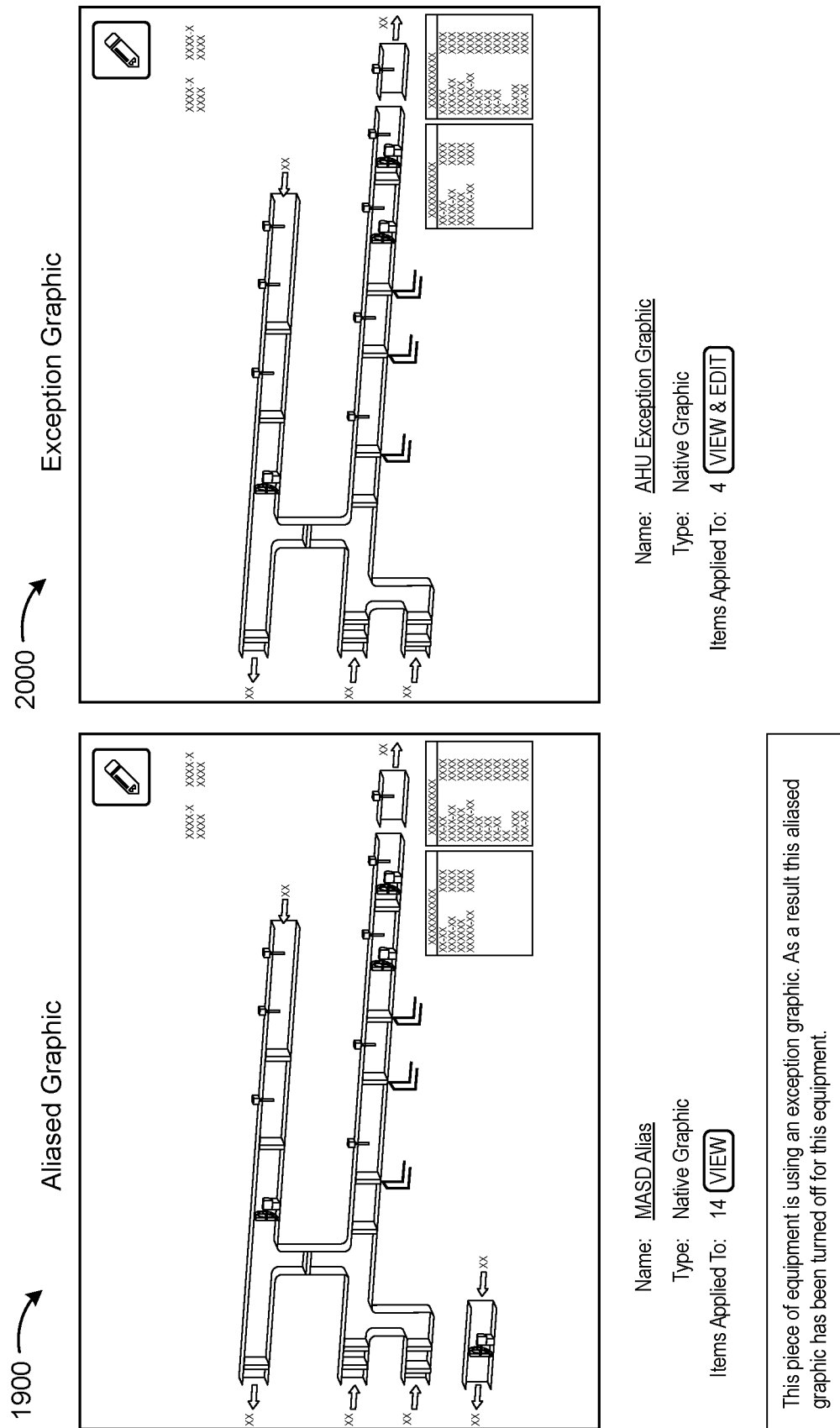
FIG. 19 is a drawing of an aliased graphic which can be provided by the BMS of FIG. 4, according to some embodiments.
FIG. 20 is a drawing of an exception graphic which can be provided by the BMS of FIG. 4, according to some embodiments.

Referring now to FIGS. 19-20, an example of an aliased graphic 1900 and an exception graphic 2000 are shown, according to an exemplary embodiment. Aliased graphic 1900 represents an AHU with outdoor ductwork, whereas exception graphic 2000 represents an AHU without outdoor ductwork. Aliased graphic 1900 and exception graphic 2000 can be used when some, but not all, equipment with a given equipment definition will use the same graphic. For example, consider a system in which some AHUs with a particular equipment definition have outdoor ductwork, but other AHUs do not. Aliased graphic 1900 can be created and assigned to the AHUs with outdoor ductwork. Exception graphic 2000 can be created and assigned to the AHUs without the outdoor ductwork. Advantageously, only two graphics 1900 and 2000 need to be created for all of the AHUs with a common equipment definition.

Figure 21:
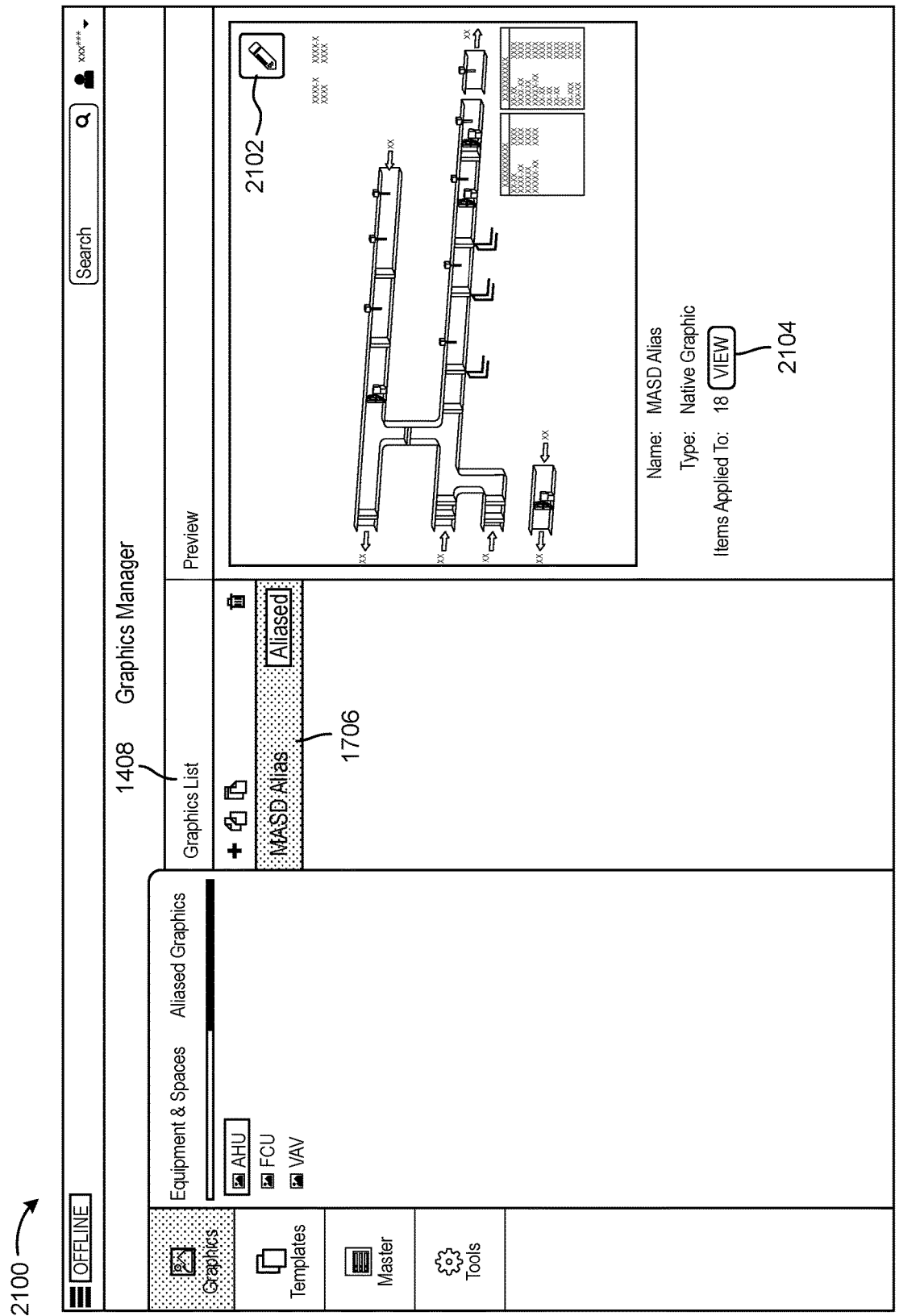
FIG. 21 is a drawing of an interface for creating and managing aliased graphics and exception graphics, according to some embodiments.
Figure 22:
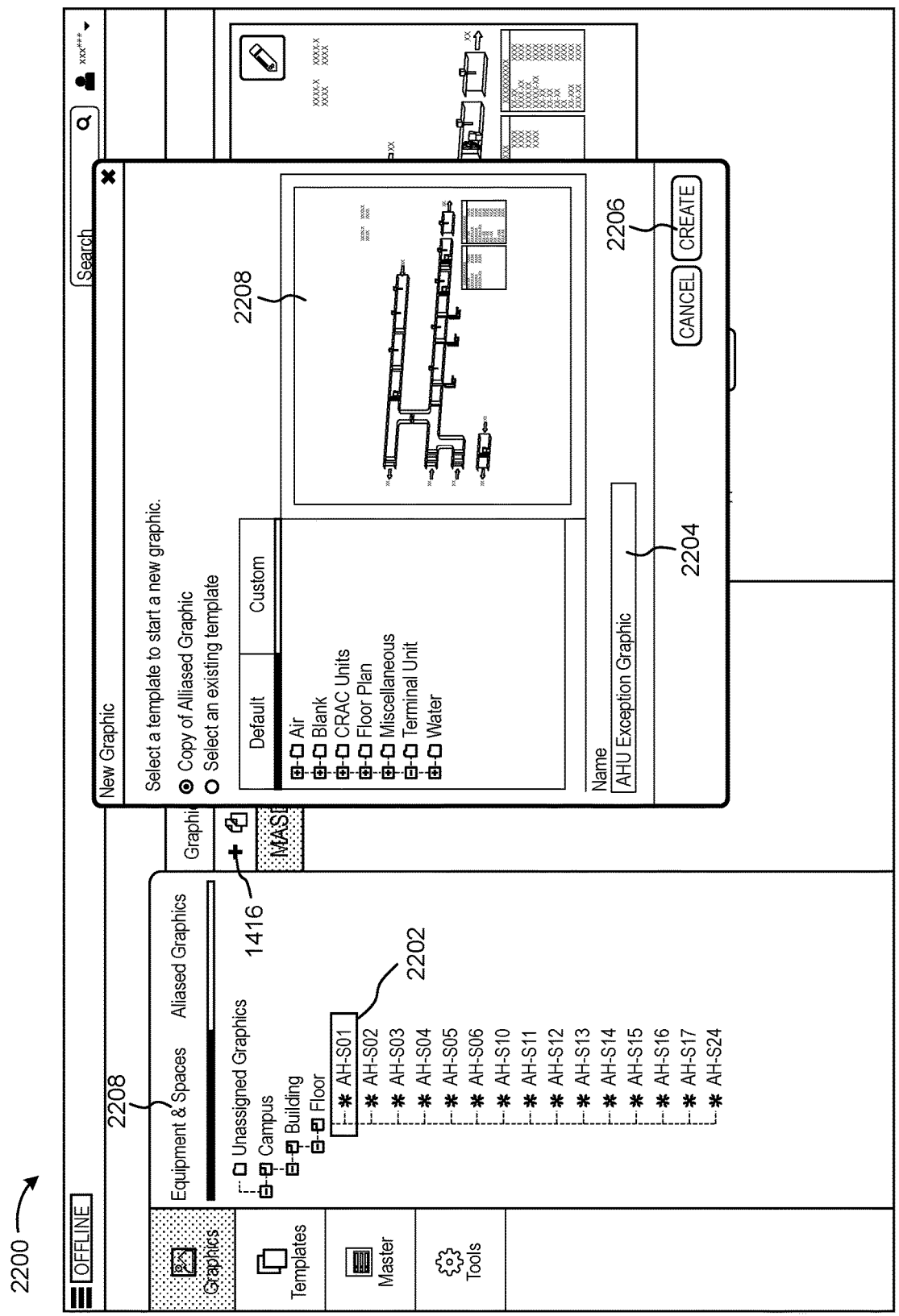
FIG. 22 is a drawing of an interface which can be used to create an exception graphic, according to some embodiments.
Figure 23:
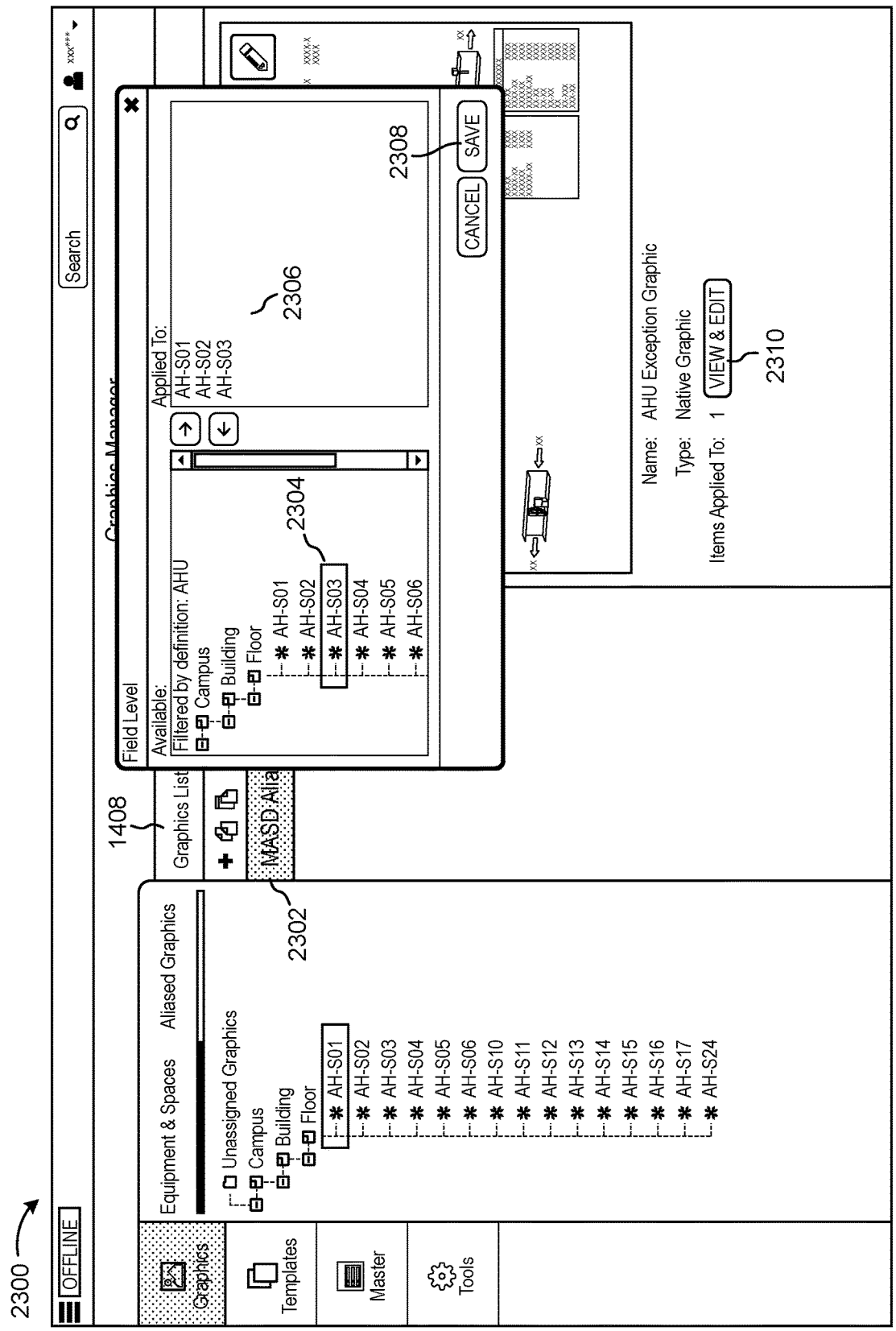
FIG. 23 is a drawing of an interface for assigning an exception graphic to one or more spaces or pieces of equipment, according to some embodiments.

Referring now to FIGS. 21-23, interface 2100-2300 for creating and managing aliased graphics and exception graphics are shown, according to an exemplary embodiment. Interface 2100 is shown to include an aliased graphic 1706 in graphics list 1408. When aliased graphic 1706 is selected, a preview 2102 of aliased graphic 1706 may be displayed. A user can select view button 2104 to view a list of the equipment to which aliased graphic 1706 has been assigned (i.e., the equipment that meets the equipment definition).

Interface 2200 can be used to create an exception graphic. The process to create an exception graphic may begin with a user selecting particular piece of equipment 2202 in equipment & spaces tree 1404. When equipment 2202 is selected, the aliased graphic 1706 associated with the equipment definition of equipment 2202 may be displayed. The user can click new graphic button 1416 to display graphic creation interface 2200. Graphic creation interface 2200 allows the user to select a template from which the new graphic will be created and give the new graphic a name 2204. A preview 2208 of the new graphic may be displayed. In some embodiments, the new graphic can be edited via interface 2202. Once the new graphic has been selected and/or edited, the user can select create button 2206 to create the new graphic.

Interface 2300 is an example of an interface for assigning an exception graphic 2302 to one or more spaces or pieces of equipment. After an exception graphic 2302 has been created, the exception graphic 2302 may be displayed in graphic list 1408. A user can click view & edit button 2310 to view any spaces/equipment 2306 to which exception graphic 2302 has been assigned. Interface 2300 may include a list 2304 of available equipment or spaces to which exception graphic 2302 can be assigned. In some embodiments, list 2304 is populated based on the equipment definition(s) associated with exception graphic 2302 or the aliased graphic to which exception graphic 2302 is an exception. The user can add or remove equipment/spaces to list 2306 and click save button 2308 to apply exception graphic 2302 to the equipment/spaces in list 2306.

Figure 24:
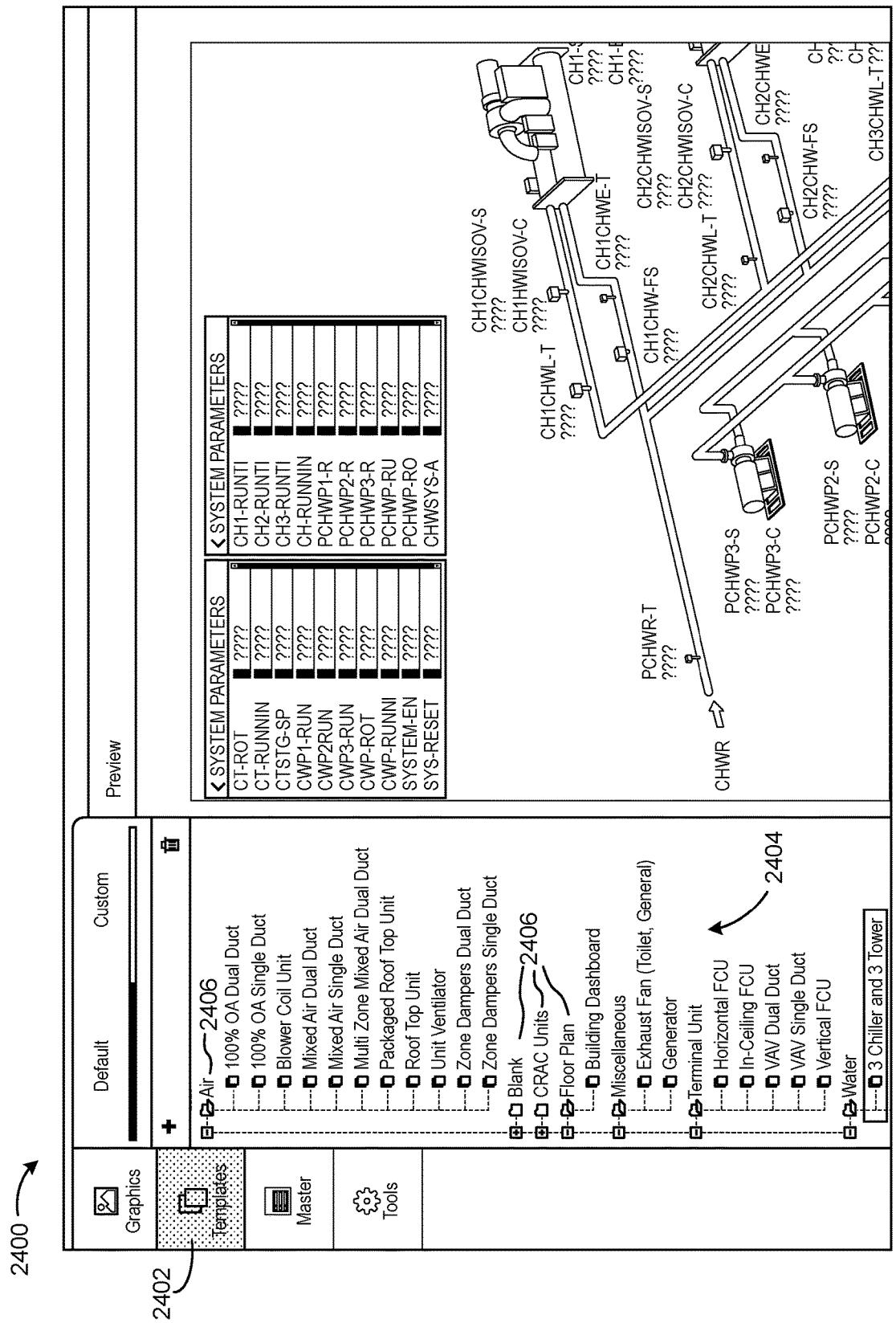
FIG. 24 is a drawing of an interface for managing and creating templates, according to some embodiments.
Figure 25:
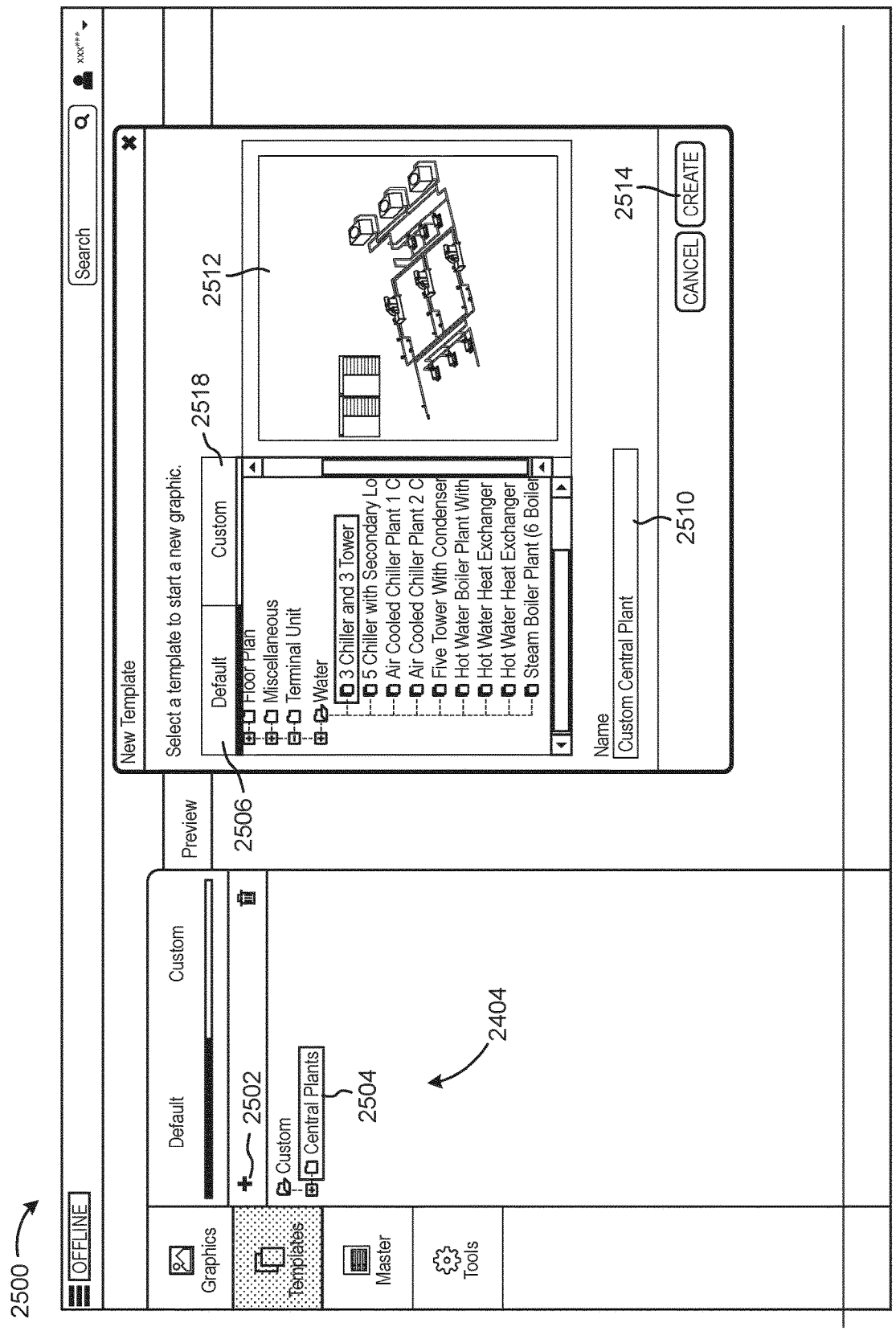
FIG. 25 is a drawing of an interface which can be used to create custom templates, according to some embodiments.

Referring now to FIGS. 24-25, interfaces 2400-2500 for managing and creating templates are shown, according to an exemplary embodiment. Interface 2400 is shown to include a templates tab 2402. Selecting templates tab 2402 may cause interface 2400 to display a list or tree 2404 of templates. Templates can include default templates and custom templates. Default templates allow the user to view a preview of the default templates, but cannot be edited or deleted. Custom templates allow the user to build a set of custom graphics that can be applied from site to site, or building to building. Custom templates can be imported or exported and can be built from a default template or another custom template. Custom templates can be organized in folders 2406 and can be reordered or reorganized by dragging and dropping in interface 2400.

Interface 2500 is an example of an interface which can be used to create custom templates. A user can add a new folder 2504 in templates tree 2404 and can click the new template button 2502 to create a new custom template. Interface 2500 is shown to include a default template tab 2506 and a custom template tab 2508 which allow the user to select an existing template to serve as the starting point for the new custom template. A preview 2512 of the selected template may be shown in interface 2500. The user can enter a name 2510 for the custom template and select the create button 2514 to create the new custom template.

Figure 26:
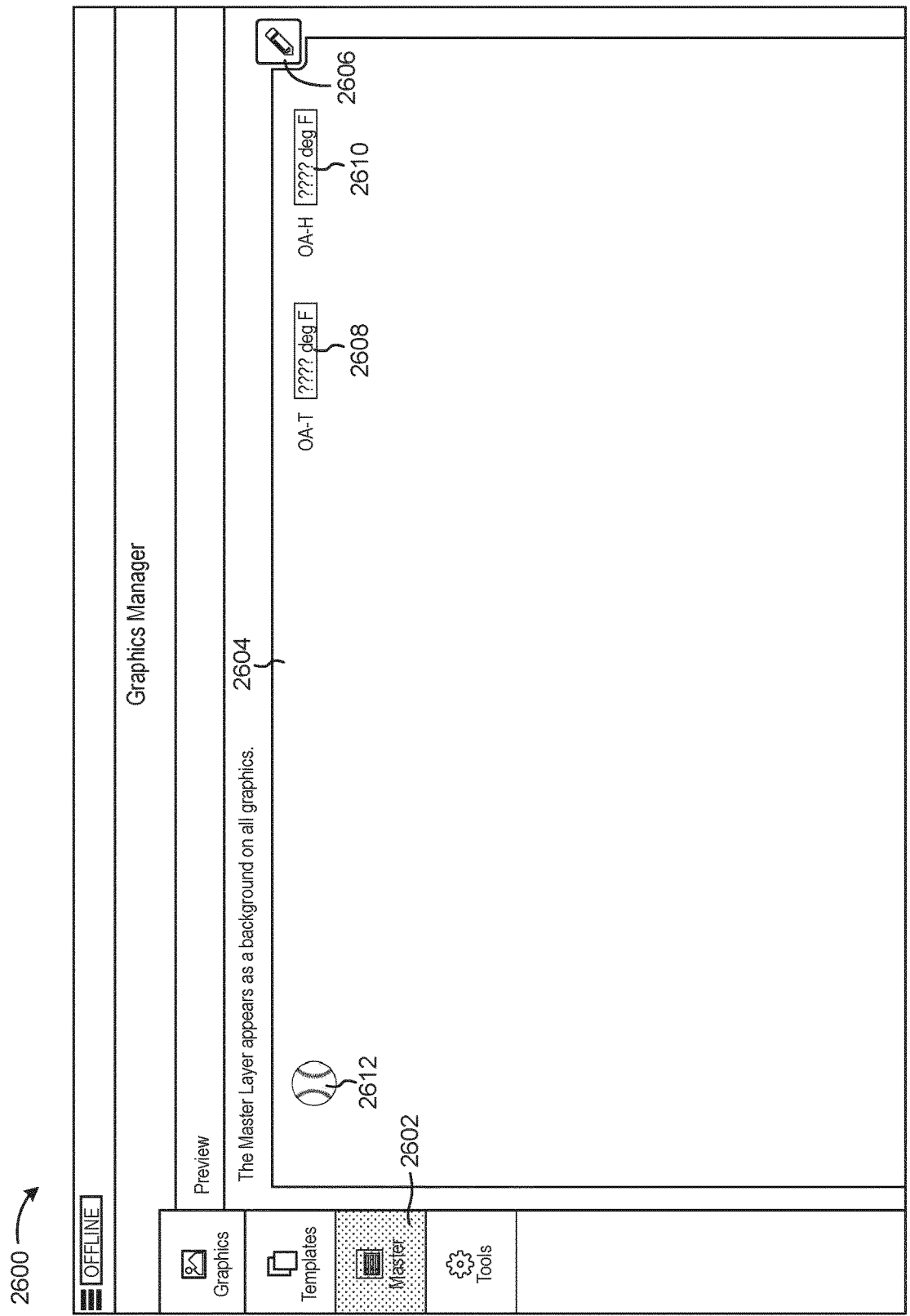
FIG. 26 is a drawing of an interface for creating a master layer are shown, according to some embodiments.
Figure 27:
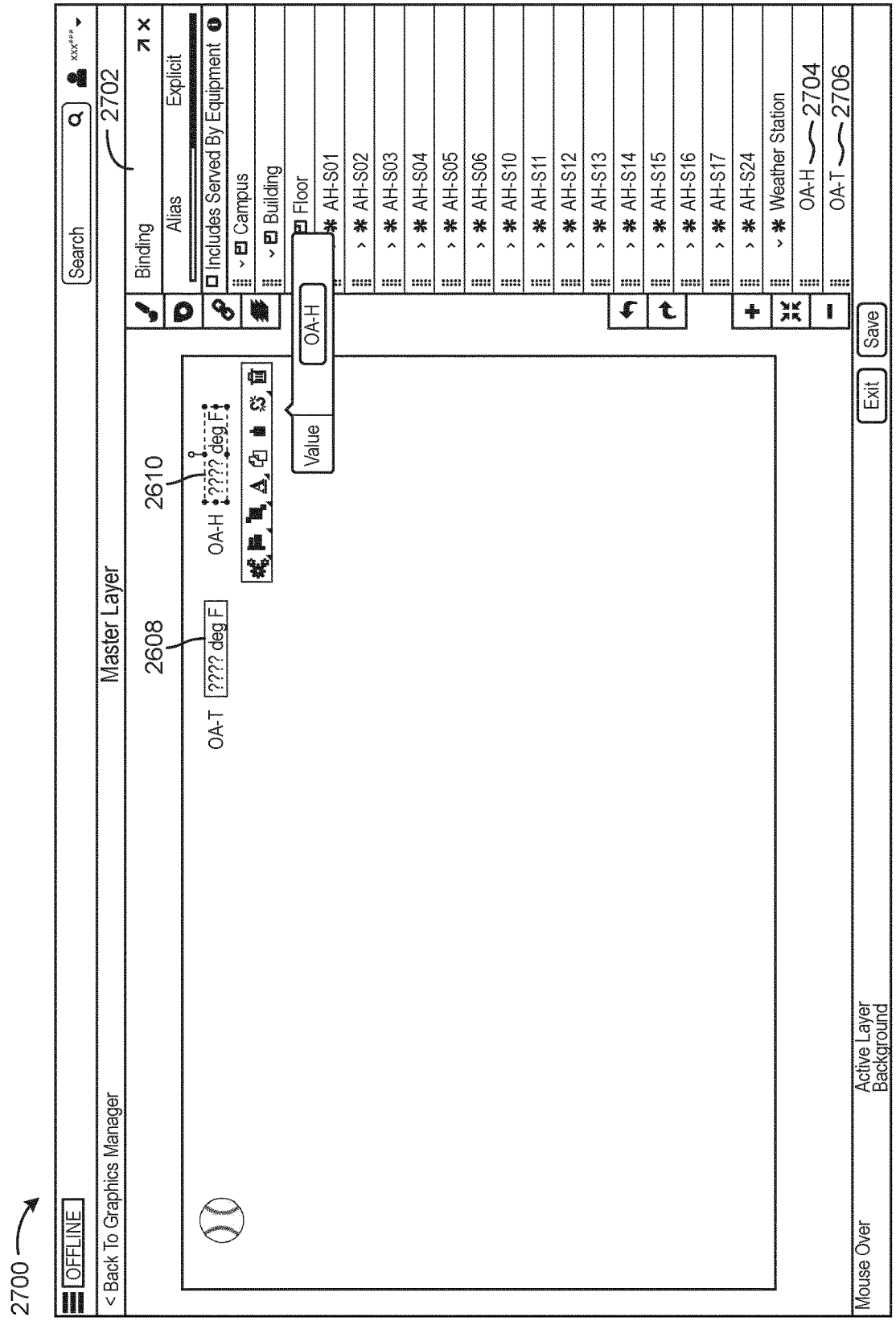
FIG. 27 is a drawing of an interface which can be used to create and edit the master layer of FIG. 26, according to some embodiments.
Figure 28:
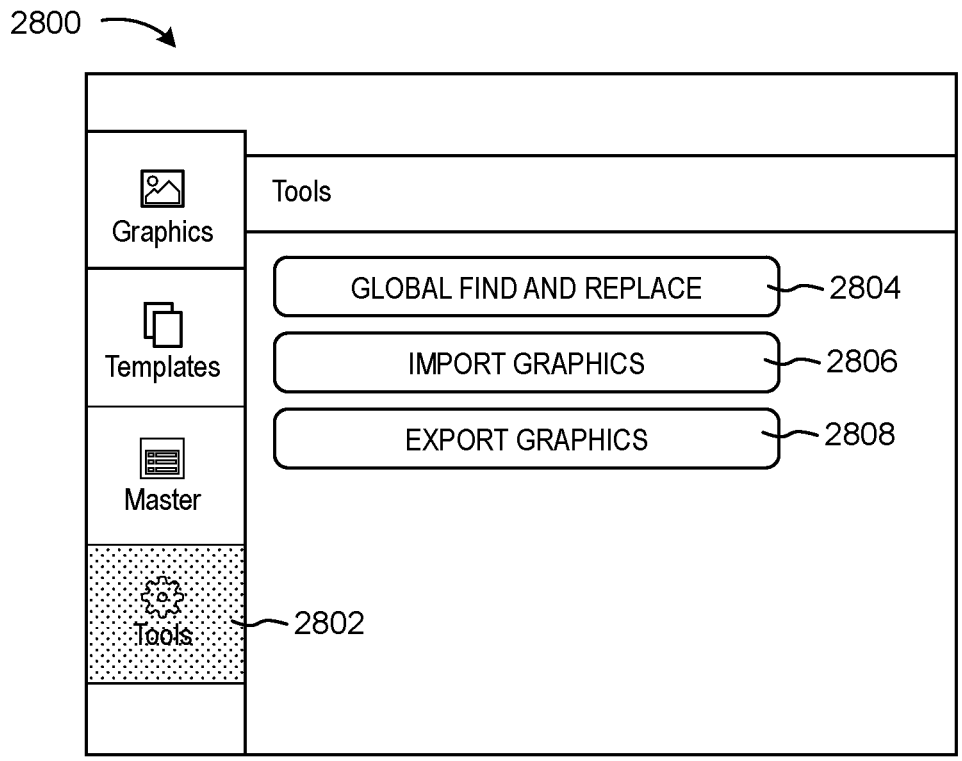
FIG. 28 is a drawing of an interface for interacting with various tools provided by the graphics manager, according to some embodiments.
Figure 29:
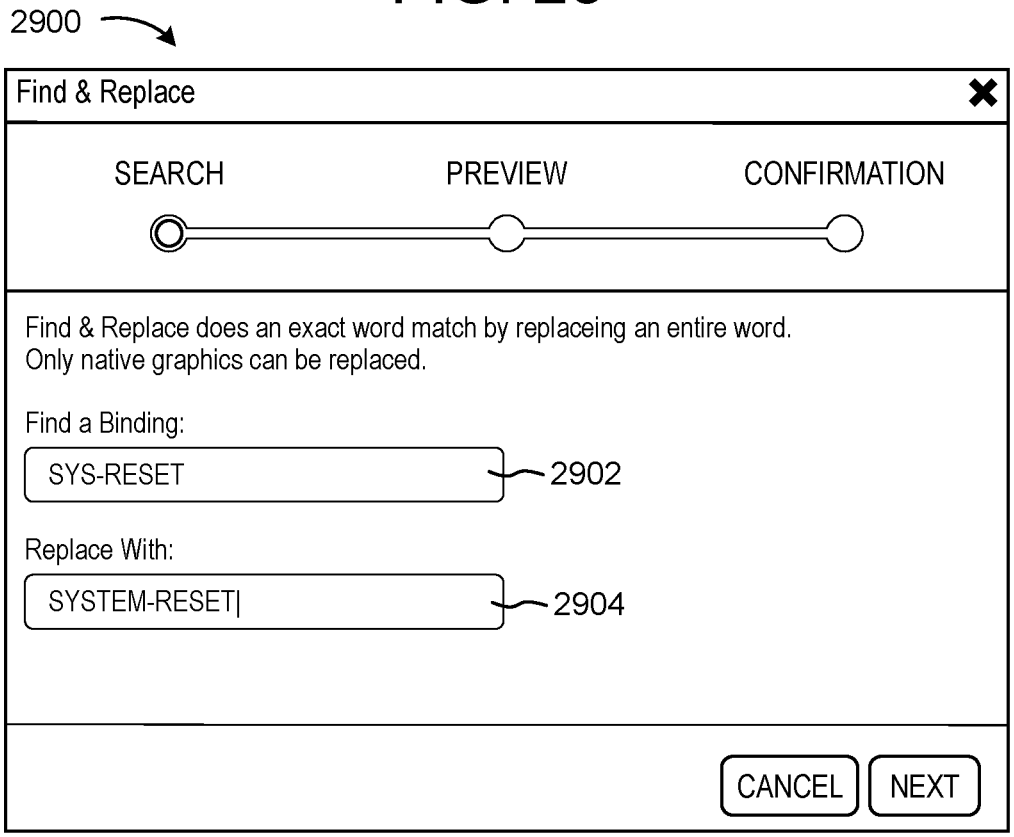
FIG. 29 is a drawing of an interface which can be used to find and replace text in any of the graphics or templates managed by the graphics manager, according to some embodiments.
Figure 30:
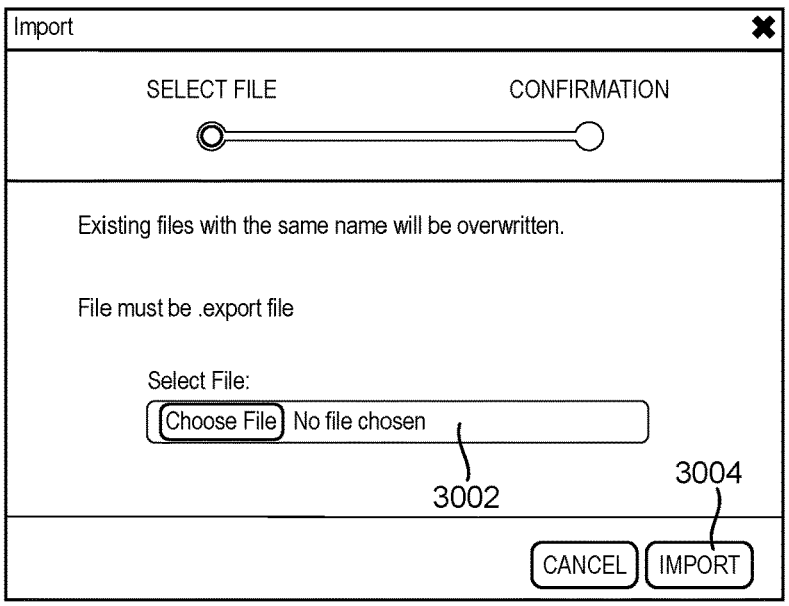
FIG. 30 is a drawing of an interface for importing files to the graphics manager, according to some embodiments.
Figure 31:
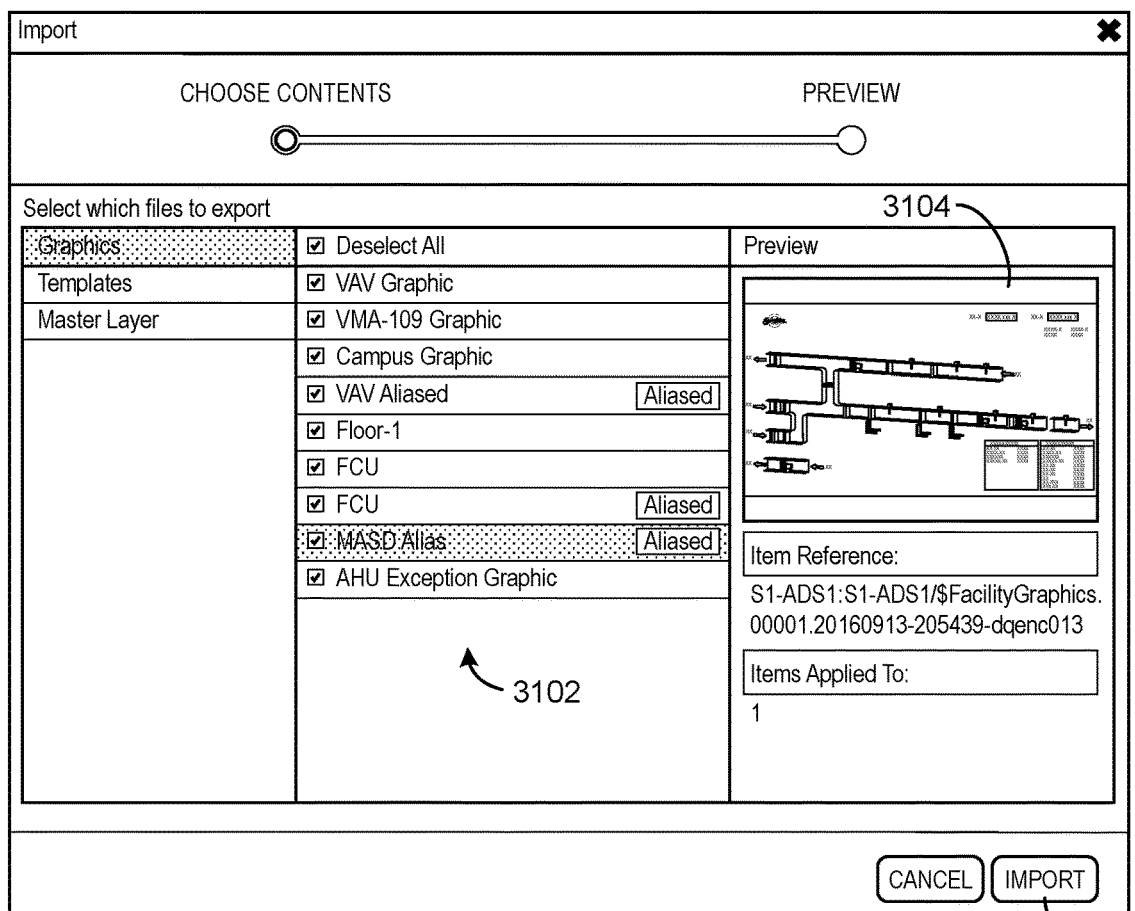
FIG. 31 is a drawing of an interface for exporting files from the graphics manager, according to some embodiments.

Referring now to FIGS. 26-27, interfaces 2600-2700 for creating a master layer are shown, according to an exemplary embodiment. Interface 2600 is shown to include a master tab 2602. Selecting master tab 2602 may cause interface 2600 to display a master layer 2604. Master layer 2604 may act as the background layer for all graphics. Master layer 2604 is shown to include point values 2608 and 2610 which can be explicitly bound to particular points in BMS 400. Master layer 2604 can be customized to include a custom logo 2612 or color scheme, background images or color, outdoor air temperature and humidity, or any other graphics as may be desired. Master layer 2604 can be enabled or disabled for individual graphics on a per-graphic basis.

Interface 2700 is an example of an interface which can be used to create and edit master layer 2604. In some embodiments, interface 2700 is displayed when a user selects edit button 2606 in interface 2600. Interface 2700 may include options that allow the user to define a color scheme, insert graphics or images, add text or other objects, and bind the objects to specific points in BMS 400. For example, interface 2700 is shown to include a bindings tab 2702. Bindings tab 2702 may include a list of equipment or points in BMS 400. The user can drag and drop points from bindings tab 2702 onto objects in master layer 2604 to bind the values of the points onto the objects. The values of the points may then be displayed in master layer 2604. For example, the user can drag and drop the outdoor air humidity point "OA-H" onto object 2610 to cause object 2610 to display the outdoor humidity. Similarly, the user can drag and drop the outdoor air temperature point "OA-T" onto object 2608 to cause object 2608 to display the outdoor humidity.

Referring now to FIGS. 28-31, interfaces 2800-3100 for interacting with various tools provided by the graphics manager are shown, according to an exemplary embodiment. Interface 2800 is shown to include a tools tab 2802. Tools tab 2802 may include a global find & replace button 2804, an import graphics button 2806, and an export button 2802. Each of buttons 2804-2808 corresponds to a tool provided by the graphics manager. Selecting any of buttons 2804-2808 may cause the corresponding tool to be displayed.

Interface 2900 is an example of an interface which can be used to find and replace text in any of the graphics or templates managed by the graphics manager. Finding and replacing text may be useful when a site's naming convention does not match the templates. Interface 2900 can be used to update the name of a point such that automatic binding can be performed. Interface 2900 is shown to include a "find a binding" box 2902 which allows a user to enter a text string to find. The user can enter the replacement text string in the "replace with" box 2904. The find and replace tool may automatically replace the specified text with the replacement text in all user defined templates, equipment or space graphics, and alias graphics.

Interface 3000 is an example of an interface for importing files to the graphics manager. Imported files can include graphics, templates, or the master layer. The user can select a file via the file selection button 3002 and click the import button 3004 to import the file. Similarly, interface 3100 is an example of an interface for exporting files from the graphics manager. Exported files can also include graphics, templates, or the master layer. The user can select a file via menu 3102 and view a preview 3104 of the selected file. The user can click the next button 3106 to export the selected file.

Figure 34:
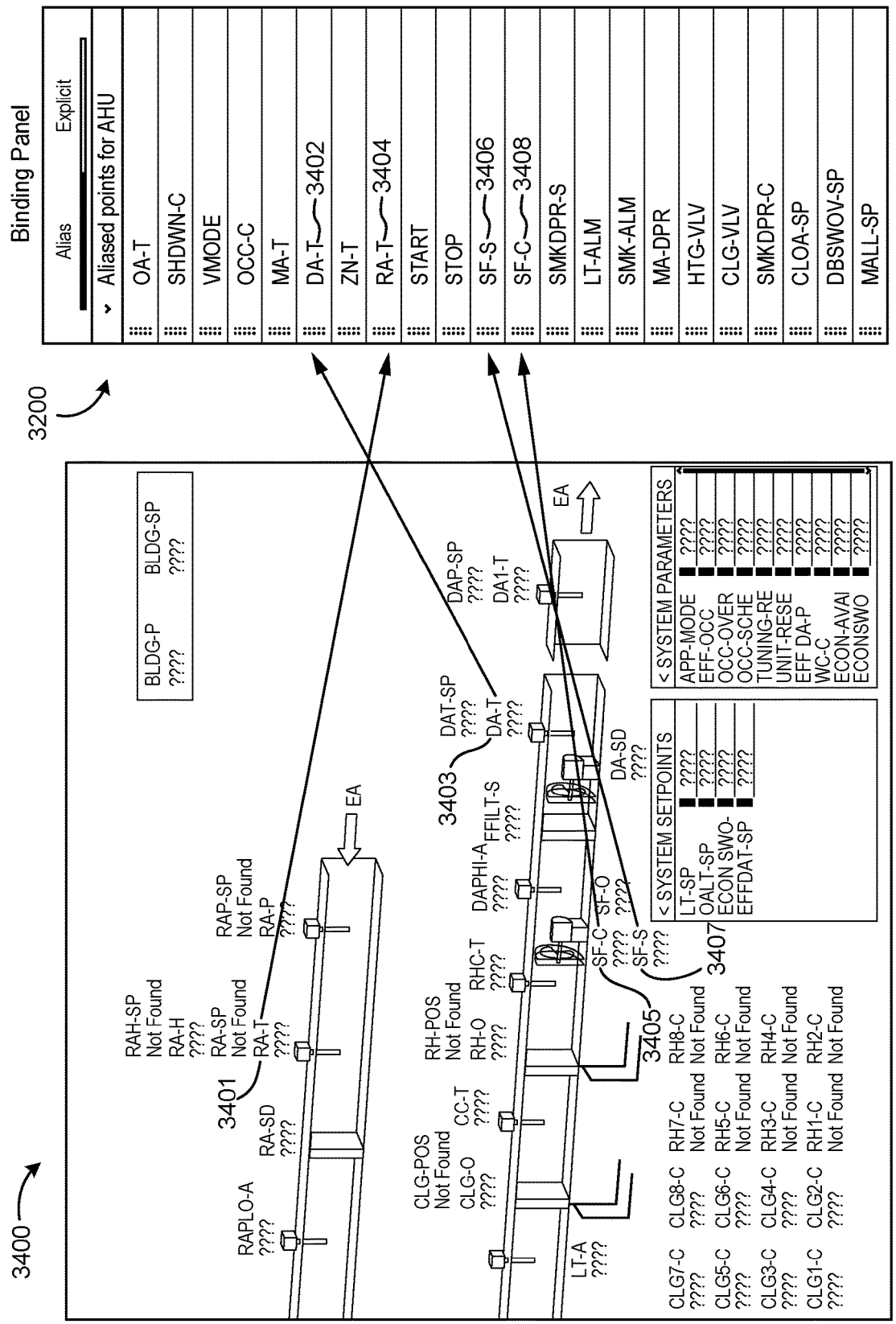
FIG. 34 is a drawing of a graphic with various points bound to aliased points in the binding panel of FIG. 32, according to some embodiments.

Referring now to FIGS. 32-34, a binding panel 3200 and equipment definition 3300 which can be used by the graphics manager are shown, according to an exemplary embodiment. As discussed previously, aliased graphics can be bound to equipment definitions 3300. Equipment definitions 3300 may identify points using short names. The alias bindings shown in binding panel 3200 may use the short name of each point in the equipment definition 3300. Accordingly, explicit bindings may resolve the same for each graphic. If the short name in the equipment definition 3300 matches the name of the point in a graphic, the graphics manager may automatically bind the point. For example, graphic 3400 (shown in FIG. 34) may include several points with point names 3401, 3403, 3405, and 3407 that match the short names 3402, 3404, 3406, and 3408 provided in binding panel 3200. The graphics manager may identify the matches and automatically bind the points that are found to match.

Figure 35:
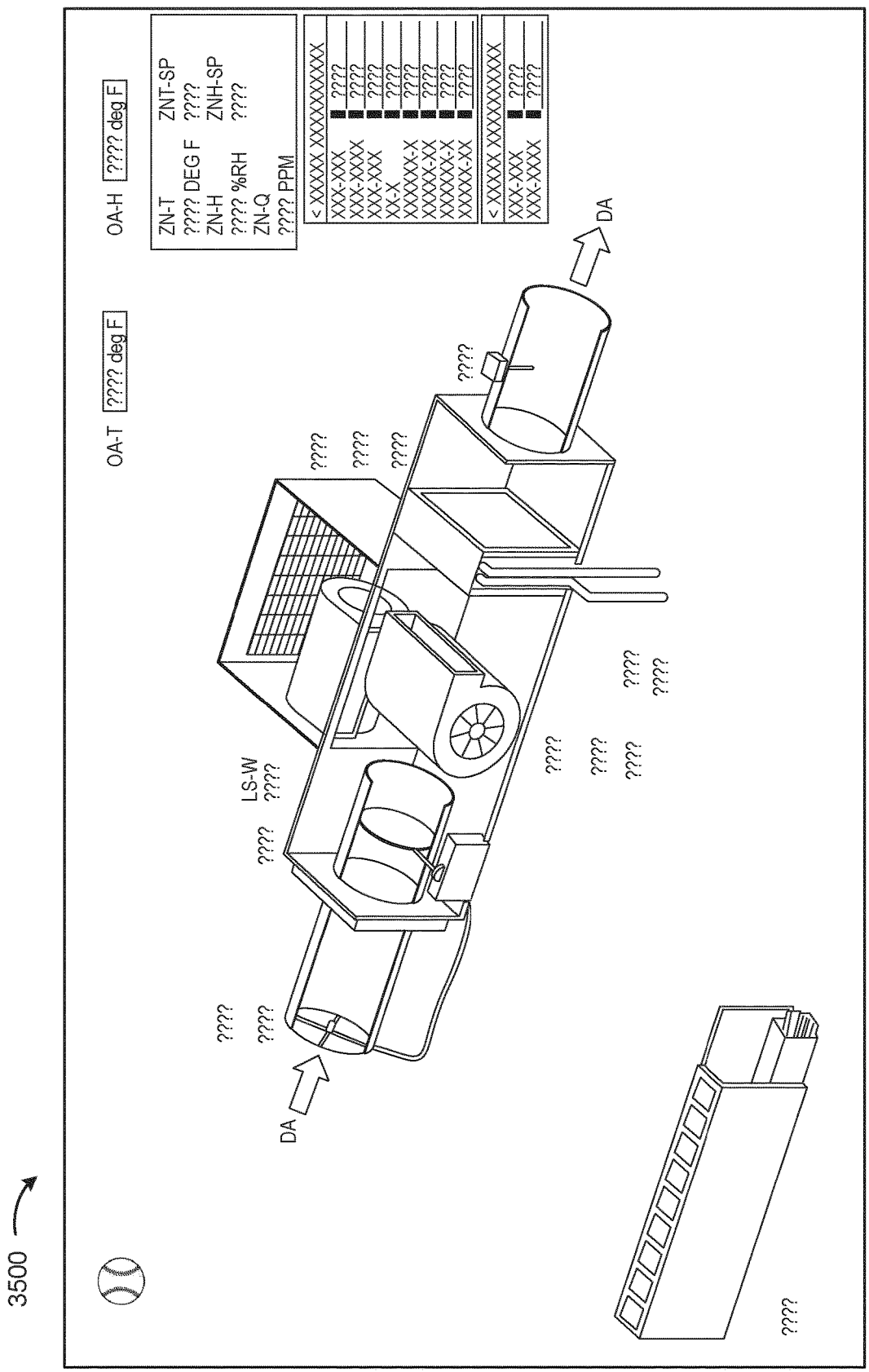
FIG. 35 is a drawing of a super template which can be used by the graphics manager, according to some embodiments.

Referring now to FIG. 35, an example of a super template 3500 is shown, according to an exemplary embodiment. Super template 3500 may be a graphics template for many pieces of equipment that have different sets of points. Super template 3500 may include a plurality of graphics and/or symbols that can be bound to particular points. However, if a point binding is not available or does not exist, super template 3500 can automatically hide the corresponding graphics and symbols. For example, a super template for a VAC may have a radiant heat and a re-heat coil. At runtime, if the VAV is a cooling only VAV, the re-heat coil and radiant heat symbols may be automatically hidden. Using super template 3500 reduces the amount of graphics to manage by using adaptive templates for different types of equipment.

Figure 36:
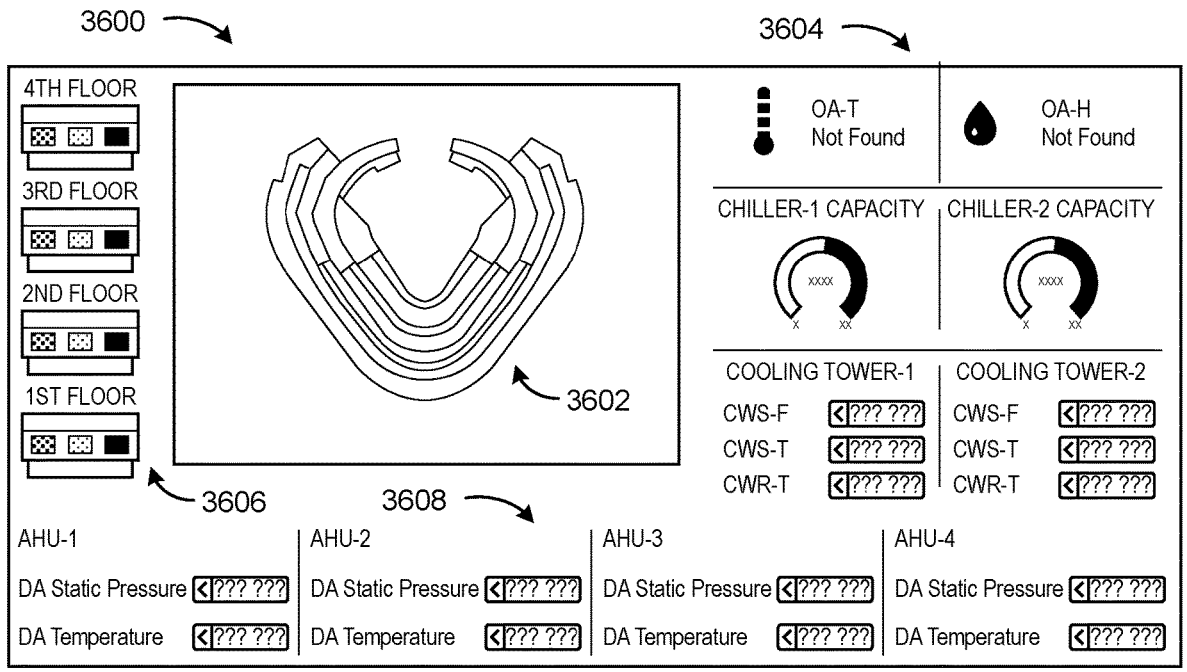
FIG. 36 is a drawing of a dashboard which can be generated by the graphics manager, according to some embodiments.
Figure 37:
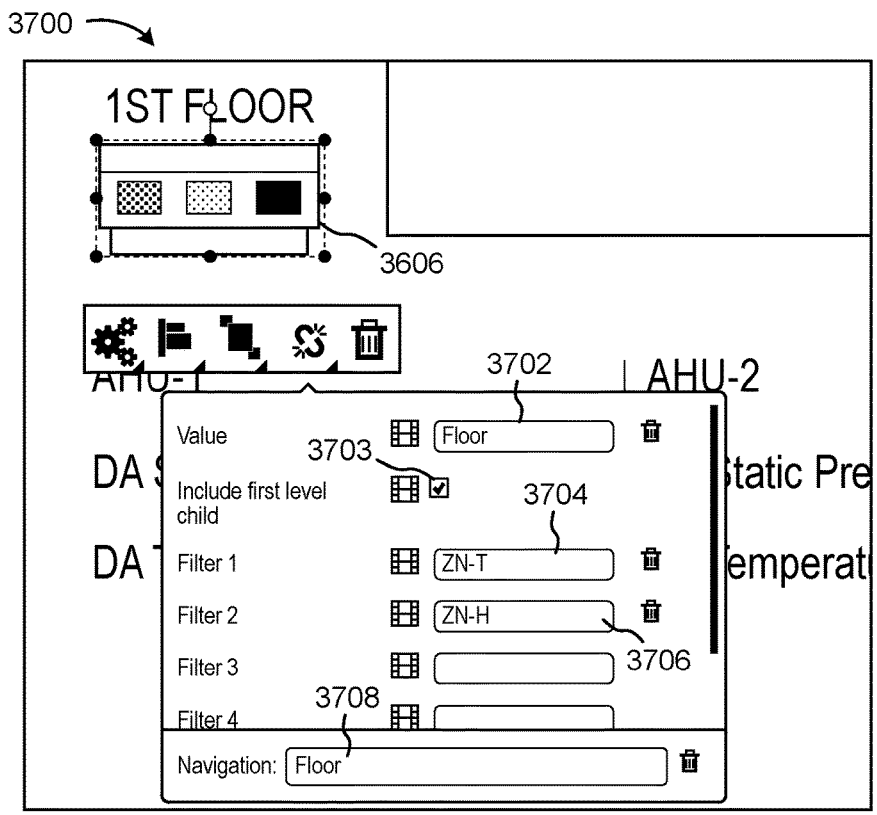
FIG. 37 is a drawing of an interface which can be used to build a status summary widget in the dashboard of FIG. 36, according to some embodiments.
Figure 38:
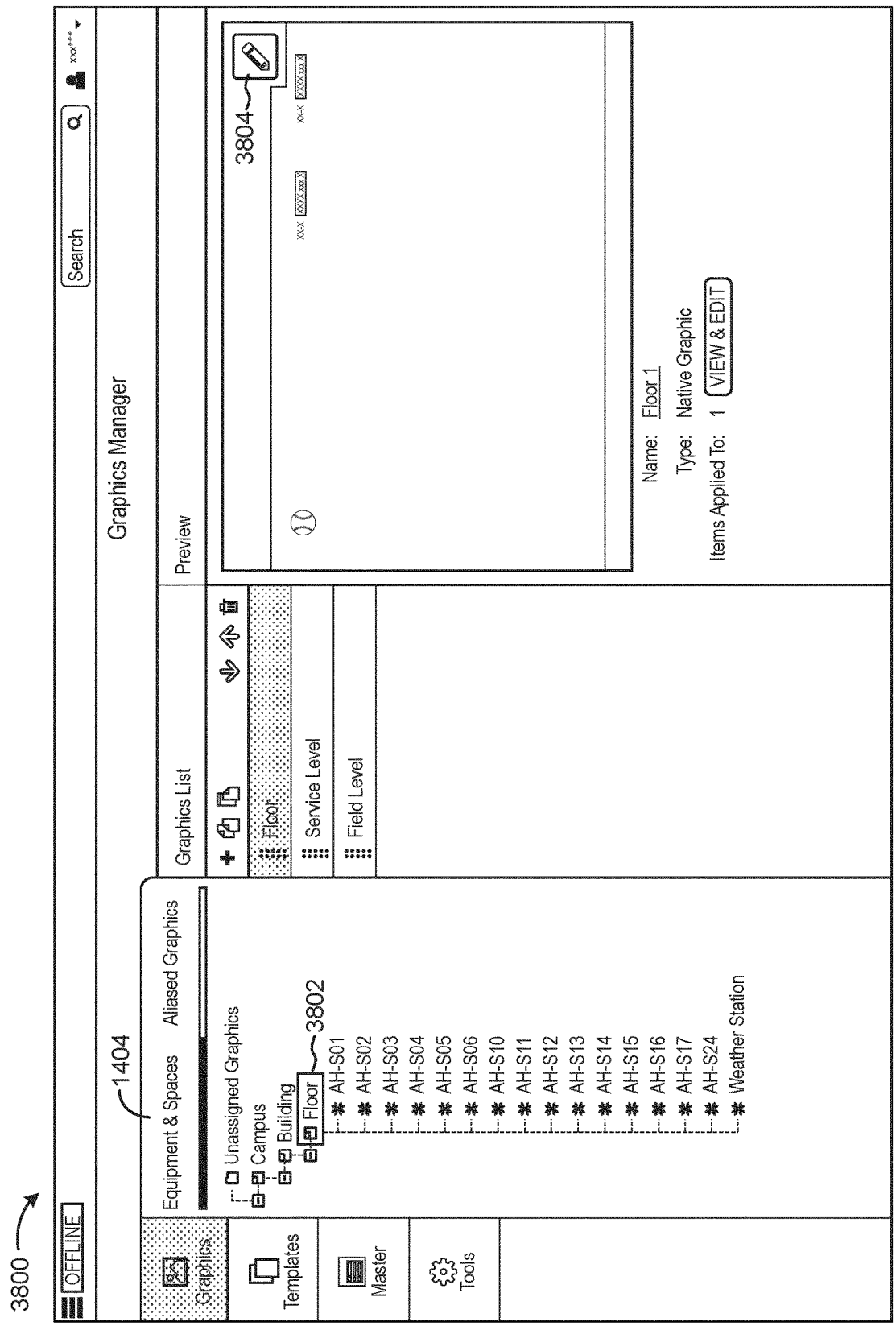
FIG. 38 is a drawing of an interface for creating a floorplan graphic, according to some embodiments.
Figure 39:
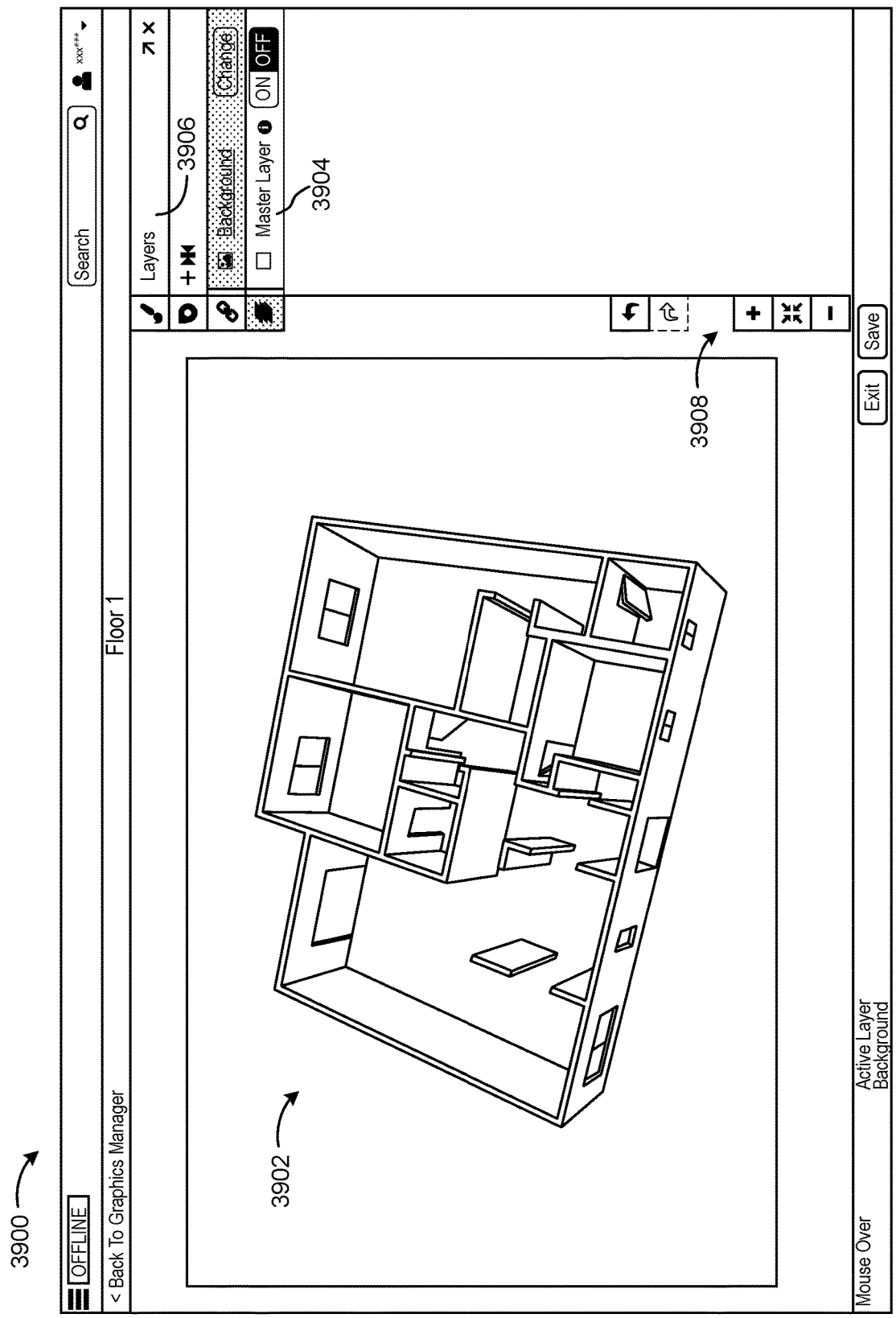
FIG. 39 is a drawing of a background image which can be imported via the interface of FIG. 38, according to some embodiments.
Figure 40:
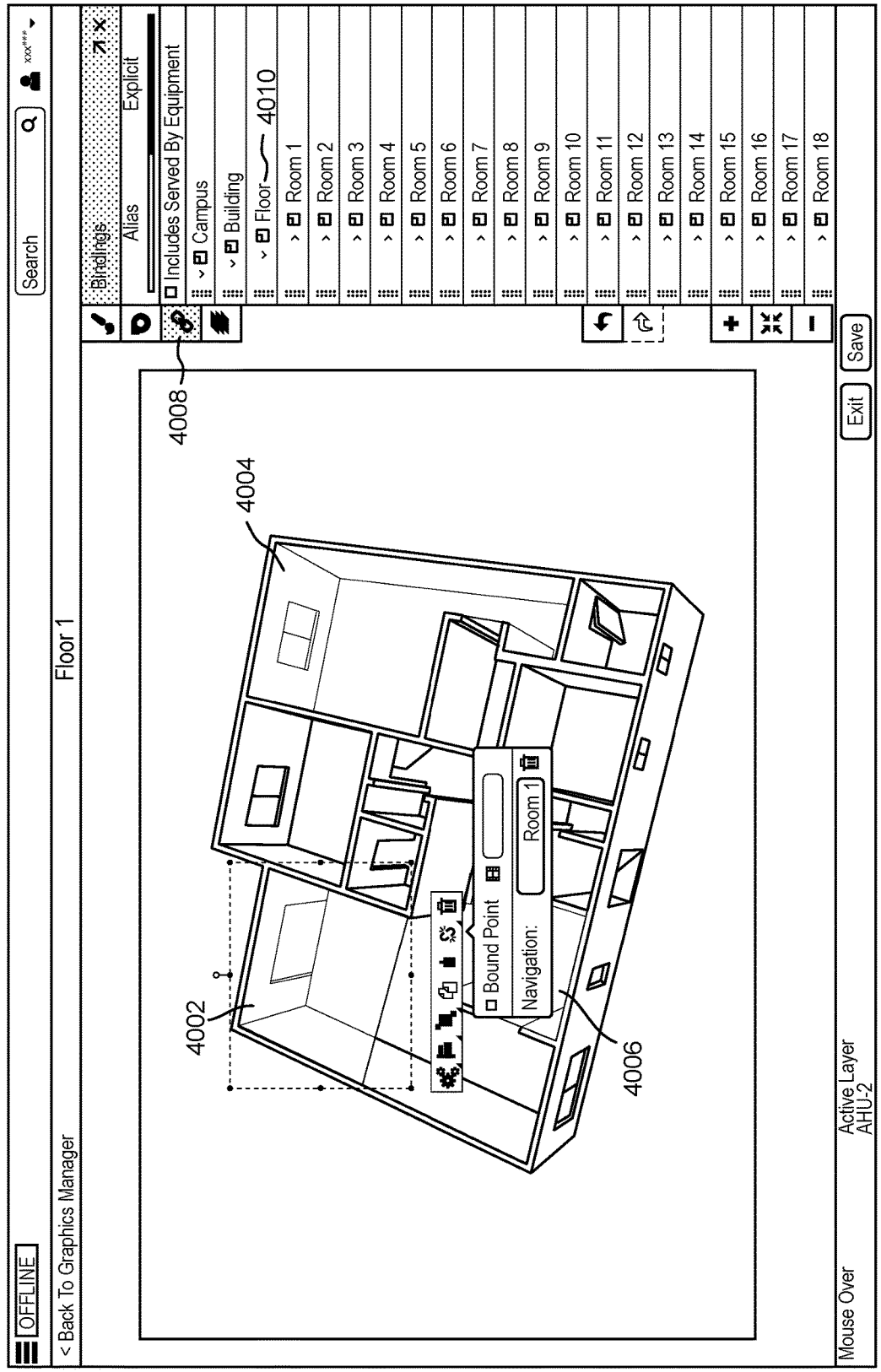
FIG. 40 is a drawing of an interface for defining spaces in a floorplan graphic, according to some embodiments.
Figure 41:
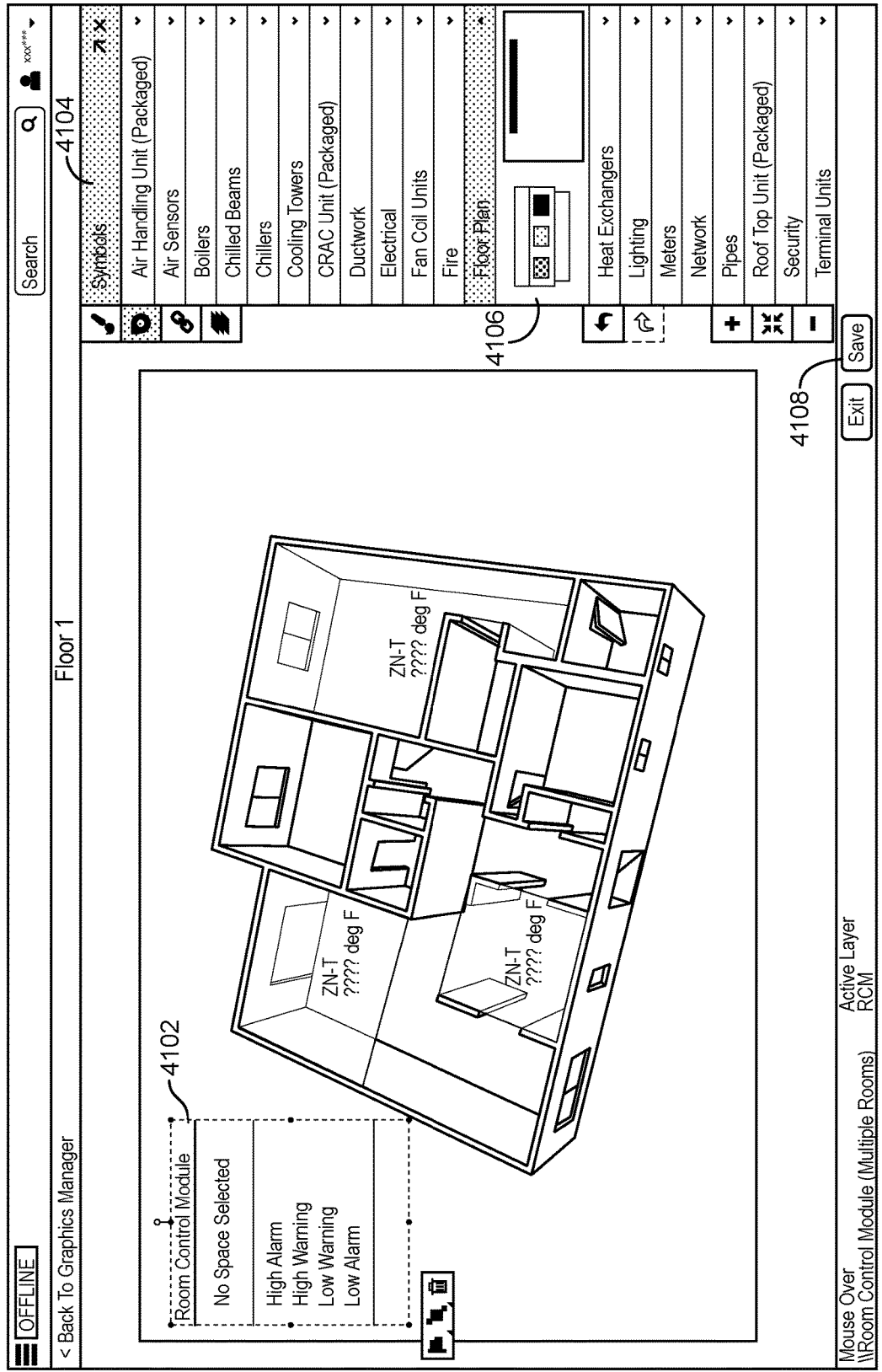
FIG. 41 is a drawing of an interface for adding a room control module to a floorplan graphic, according to some embodiments.

Referring now to FIGS. 36-37, a dashboard 3600 and an interface 3700 for building dashboard 3600 are shown, according to an exemplary embodiment. Dashboard 3600 is shown to include a floorplan 3602 and several widgets 3604, 3606, and 3608. Widgets 3604-3608 can be mapped to particular points such that the values of the mapped points are shown in dashboard 3600. Widgets 3606 are shown as status summary widgets. Status summary widgets 3606 show the count of alarms, warnings, and offline equipment associated with various spaces (e.g., first floor, second floor, third floor, fourth floor, etc.). In some embodiments, the graphics manager identifies which equipment serves the spaces and aggregates the counts of alarms, warnings, and offline equipment that serves each of the spaces.

Interface 3700 is an example of an interface which can be used to build a status summary widget 3606. Interface 3700 may allow a user to bind status summary widget 3606 to a particular space 3702. Box 3703 can be checked to indicate that widget 3606 will aggregate the equipment in space 3702 as well as any sub-spaces that are immediate children of space 3702 (e.g., rooms on a particular floor). Filters 3704 and 3706 can be used to specify various types of points to evaluate (e.g., temperature points, humidity points, etc.). Points can be specified by short name in filters 3704 and 3706. The navigation can be bound to the floor via selector 3708.

Referring now to FIGS. 38-41, several interfaces 3800-4100 for creating a floorplan graphic are shown, according to an exemplary embodiment. A floorplan graphic can be created by selecting a space 3802 in equipment & spaces tab 1404 and selecting the edit button 3804 in interface 3800. A background image for the floorplan graphic can be imported from a third-party tool such as Adobe Illustrator, Adobe After Effects, CorelDRAW, AutoDesk, etc. Supported image background formats may include .jpg, .jpeg, .png, .bmp, or other image formats.

Interface 3900 illustrates a background image 3902 which can be imported via interface 3800. The background image 3902 can be resized, rotated, cropped, and otherwise edited using editor controls 3908. Interface 3900 is shown to include a layers tab 3906 which allows the user to turn on/off various layers. For example, the user can toggle whether the master layer 3904 is displayed be selecting or deselecting the master layer 3904 via layers tab 3906.

Interface 4000 is an example of an interface for defining spaces in a floorplan graphic. A user can define spaces by drawing shapes 4002, 4004, and 4006 on top of background image 3902. For example, the user can click the corners of a room to create a shape 4004 that connects the corners and covers the area of the room. The shapes 4002, 4004, and 4006 can be bound to specific spaces and/or points in BMS 400 via bindings panel 4008. Bindings panel 4008 is shown to include a list of spaces. The user can drag and drop any of the spaces onto a shape in interface 4000 to bind the shape to the space. For example, the space 4010 (i.e., "Room 1") can be bound to shape 4002 as shown in interface 4000. Once the shape has been bound to a space or point, point values associated with the bound spaces/points can be displayed in interface 4000.

Interface 4100 is an example of an interface for adding a room control module 4102 to a floorplan graphic. Interface 4100 is shown to include a symbols tab 4104. A user can select floor plan 4106 in symbols tab 4104 and drag the room control module 4102 unto the floorplan graphic. Once the room control module 4102 has been added, the user can click the save button 4108 to save the floorplan graphic.

Figure 42:
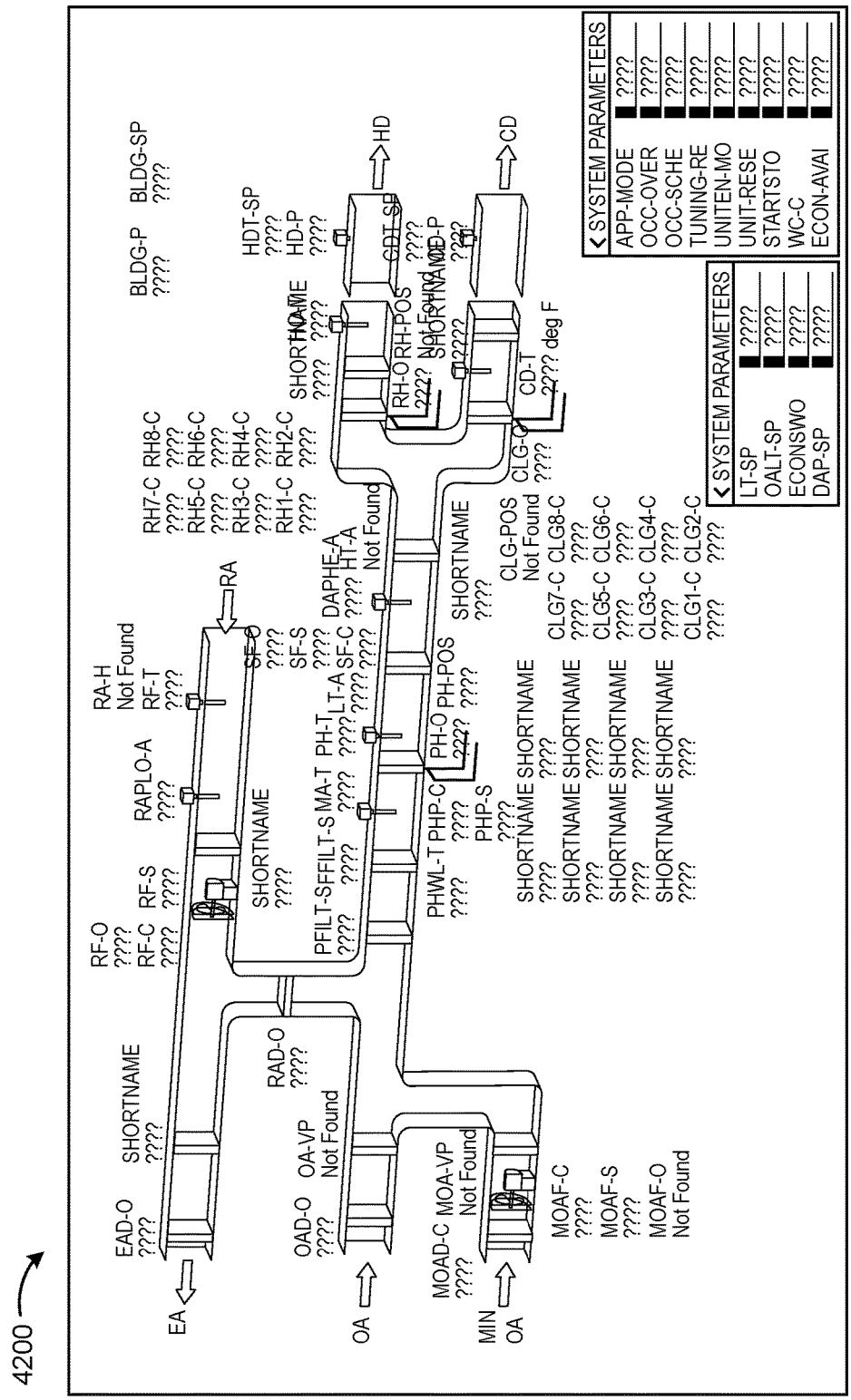
FIG. 42 is an example of an airside graphic which can be generated by the graphics manager, according to some embodiments.
Figure 43:
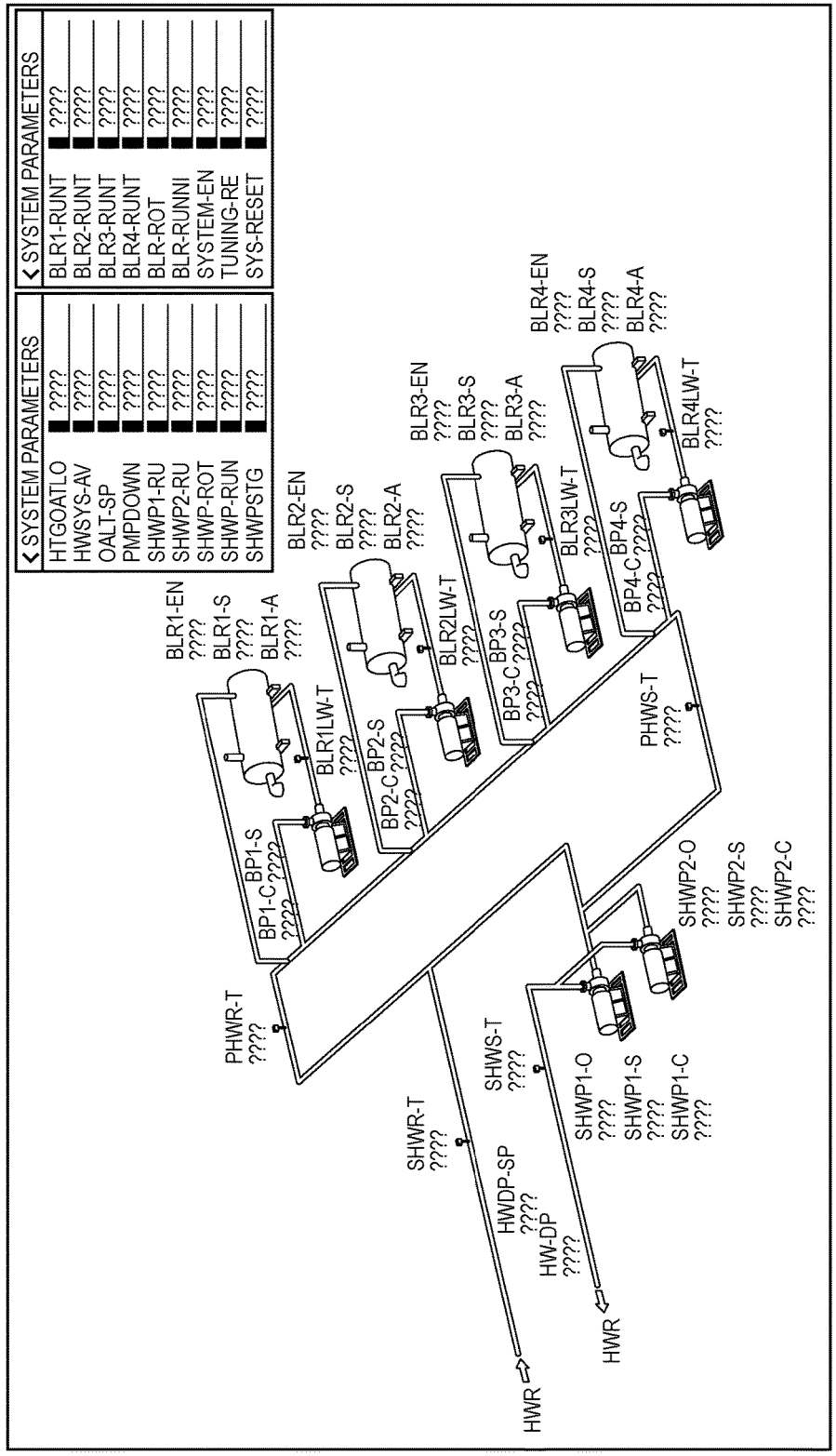
FIG. 43 is an example of a waterside graphic which can be generated by the graphics manager, according to some embodiments.
Figure 44:
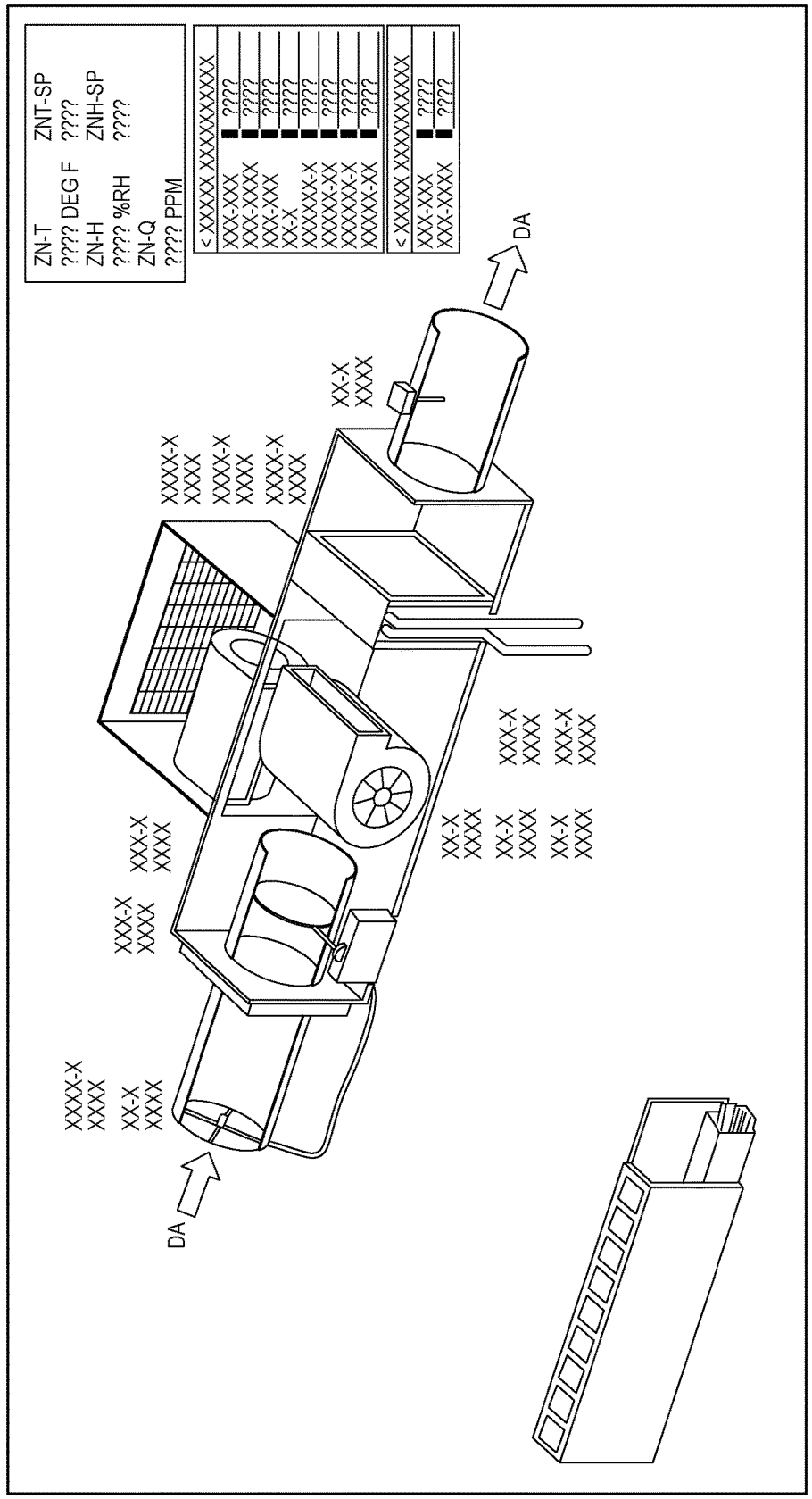
FIG. 44 is an example of an equipment symbol grouping which can be generated by the graphics manager, according to some embodiments.

Referring now to FIGS. 42-44, several graphics 4200-4400 and associated symbols are shown, according to an exemplary embodiment. Graphic 4200 is an airside graphic. Symbols designed to work with the airside graphic include air coils, air dampers, air fans, air filters, air sensors, ductwork, and pipes. Graphic 4300 is a waterside graphic. Symbols designed to work with the waterside graphic include boilers, chillers, cooling towers, heat exchangers, meters, pipes, water pumps, water sensors, and water valves. Pipes may be designed to work with both airside and waterside graphics and may snap together when added to such graphics. Graphic 4400 illustrates an equipment symbol grouping. Components that use these equipment symbol groupings may include packaged AHUs, CRAC units, chilled beams, fan coil units, packaged RTUs, terminal units, and VRF systems. Piping may work with these equipment types in some embodiments.

Figure 45:
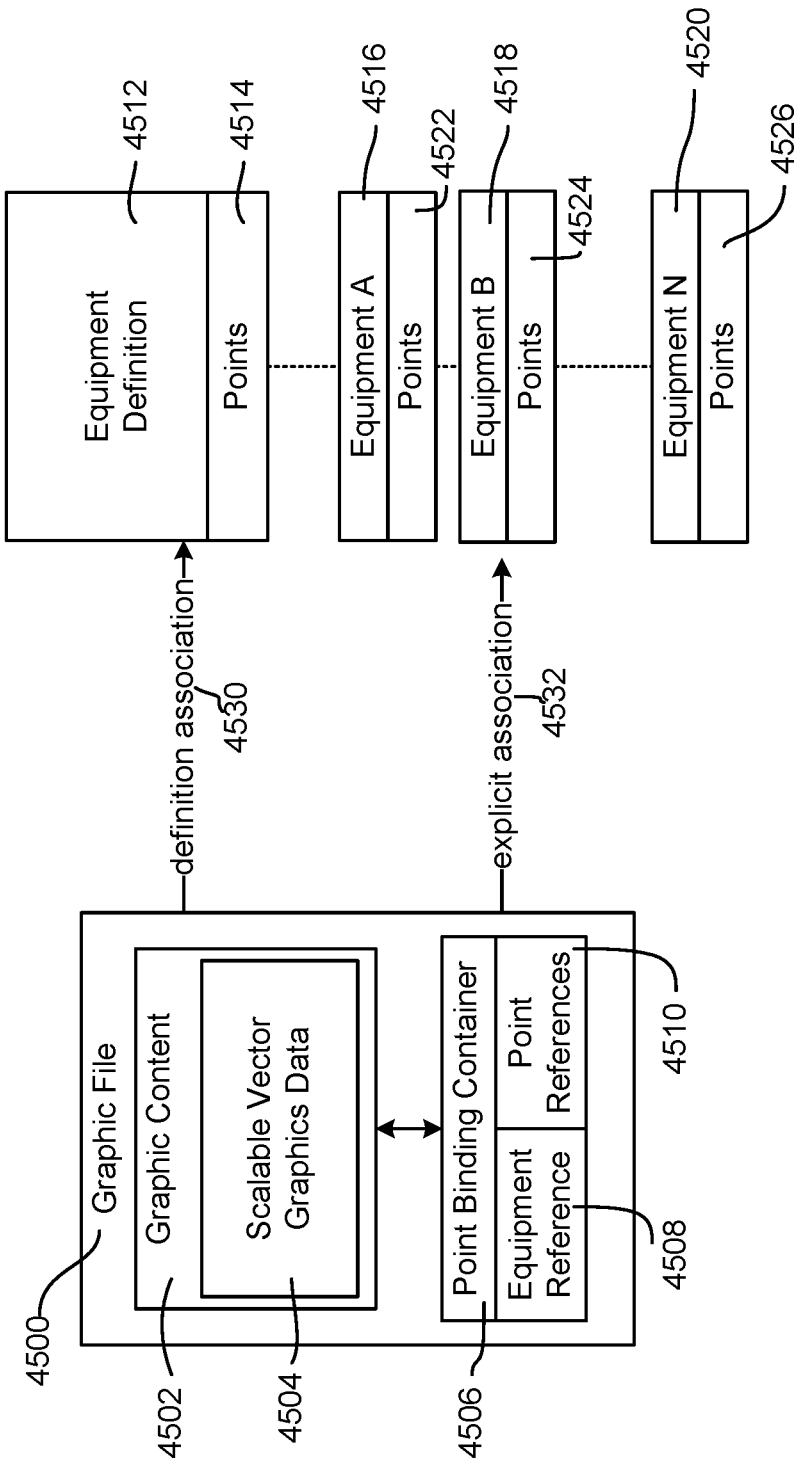
FIG. 45 is a block diagram illustrating the association of graphic files to equipment, according to an exemplary embodiments

Referring now to FIG. 45, a block diagram illustrating the association of graphic files to equipment is shown, according to an exemplary embodiment. A graphic file 4500 includes graphic content 4502 with scalable vector graphics data 4504 and point binding container 4506 with equipment reference 4508 and point reference 4510. Graphic content 4502 and scalable vector graphics data 4504 contain data that can be used to generate a display of a graphic, for example aliased graphic 1900 shown in FIG. 19. The point binding container 4506 includes references that facilitate the association of the graphic file 4500 with equipment managed by the BMS and with points corresponding to data provided by that equipment, namely equipment reference 4508 and point references 4510. Point references 4510 may be bound to specific parts of the graphic content 4502 that a section or element of the graphic associated with that point.

Equipment definition 4512 is an abstraction from a physical piece of building equipment that defines the various data points (i.e., points 4514) that are typically associated with a particular type of building equipment. Equipment definition 4512 and points 4514 are generalized across models, manufacturers, vendors, other differences between building equipment of the same general type.

Particular pieces of building equipment are represented as equipment A 4516, equipment B 4518, through equipment N 4520. Equipment A 4516, equipment B 4518, through equipment N 4520 are discrete instances of equipment of the type defined by equipment definition 4512. Equipment A 4516 includes points 4522 that correspond to points 4514, although in some cases the points 4522 of equipment A 4516 may not include all of the points 4514. Points 4524 of equipment B and points 4526 of equipment N also correspond to points 4514, and may, in some cases, include fewer or extra points.

As shown in FIG. 45, an instance of equipment (e.g., equipment A 4516) can be associated with the graphic file 4500 in either of two ways. First, a definition association 4530 binds the graphic file 4500 to the equipment definition 4512. The graphic file 4500 is then associated with each instance of equipment (e.g., equipment A 4516) associated with the equipment definition 4516. That is, the equipment reference 4508 in the point binding container 4506 can be updated to refer to the particular equipment, for example equipment A 4516. Second, an explicit association 4532 directly associates the graphic file 4500 to an instance of equipment, for example equipment B 4518. That is, the equipment reference 4508 in the point binding container 4506 is updated to refer to the particular equipment, for example equipment B 4518. An explicit association 4532 voids or overrules a definition association 4530.

Figure 46:
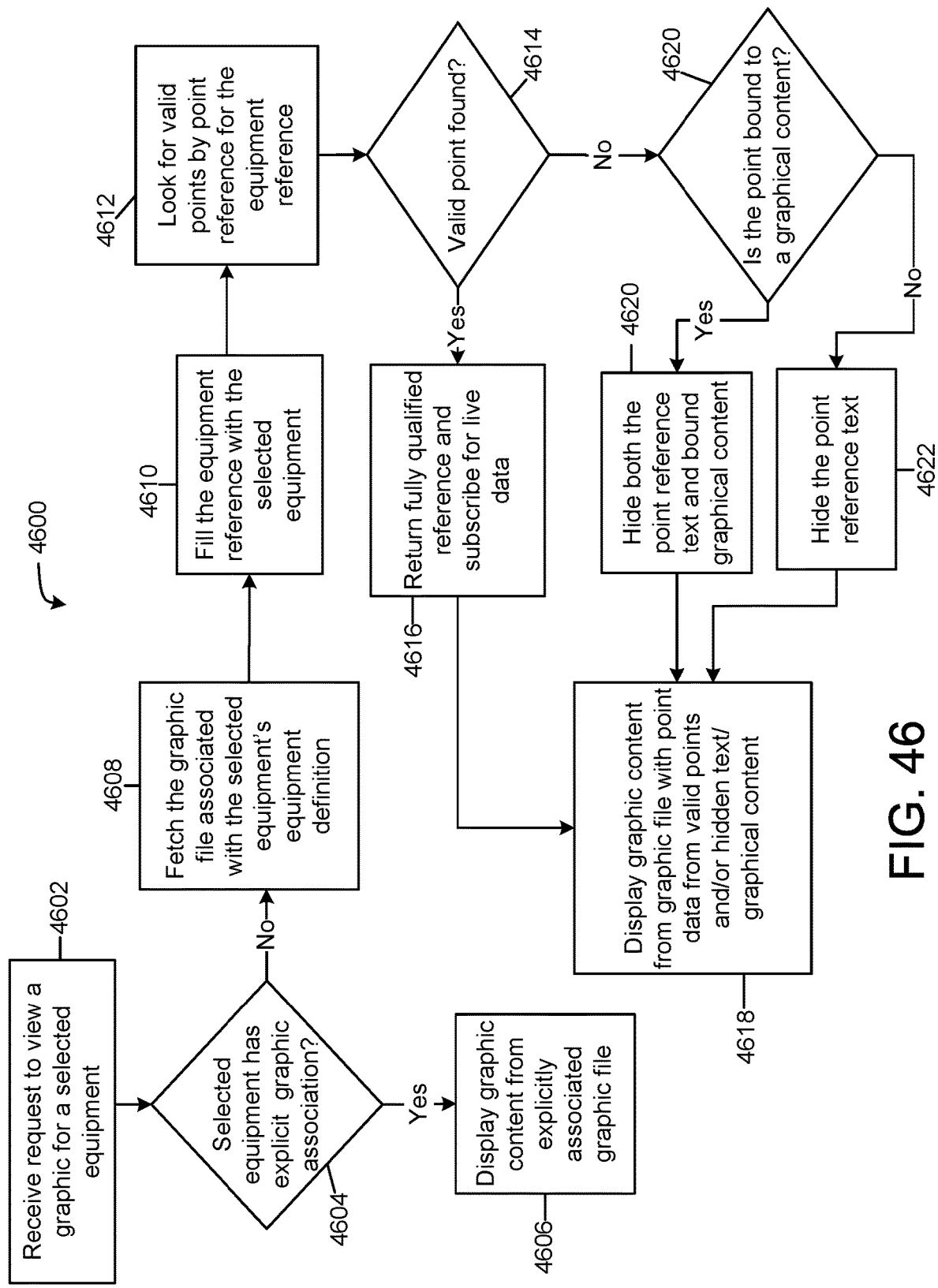
FIG. 46 is a flowchart of a process for generating a graphic using the graphic file associations illustrated in FIG. 45, according to an exemplary embodiment.

Referring now to FIG. 46, a process 4600 for generating a graphic using the graphic file associations illustrated in FIG. 45 is shown, according to an exemplary embodiment. At step 4602, the graphics manager receives a request from a user to view a graphic for a selected equipment. At step 4604, the graphics manager determines whether the selected equipment has an explicit graphic association (e.g., explicit association 4532 of FIG. 35). If the selected graphic has an explicit graphic association, the graphic content from the explicitly associated graphic file is displayed.

If the selected graphic does not have explicit graphic association, the graphics manager checks the selected equipment's equipment definition and fetches the graphic file associated with that equipment definition (i.e., definition association 4530 of FIG. 35) at step 4608. At step 4610, the equipment reference 4508 of the graphic file 4500 is filled with the selected equipment. At step 4612, the graphics manager uses the equipment reference (i.e., for the selected equipment) to look for valid points that correspond to point references 4510. That is, the graphics managers determines whether the selected equipment provides data of the point type referred to in each point reference 4510. At step 4614, the graphics manager determines whether a valid point was found.

If a valid point was found, at step 4616 the graphics manager gets the fully qualified reference (FQR) for the valid point and subscribes to live data for that point using the FQR. The graphics manager can thereby get live data for the point references 4510 present in the graphic file 4500.

If no valid point is found for a point, the graphics manager asks at step 4620 if the point is bound to a graphical content (e.g., whether the point is represented in the graphical content as image of an equipment component). If the point is not bound to graphical content, any textual reference to that point that would otherwise be displayed is hidden at step 4622. If the point is bound to a graphical content, that graphical content is hidden, as is any textual reference to the point at step 4622. Thus, for example, if the selected equipment does not include a component that is included in other models of that type of equipment, that component may be included in the graphic content 4502 associated with the selected equipment but hidden in the graphic displayed for the selected equipment. This avoids the need for separate graphic files for each model, instance, or other variation of equipment of a given type.

At step 4618, then, the graphics manager can create a display of the graphic content (e.g., a scalable vector graphic based on scalable vector graphic data 4504) that includes point data from the valid points (i.e., from step 4616) and that hides reference text (i.e., step 4622) and/or bound graphical content (i.e., step 4620). The display generated at step 4618 thereby includes all graphics and points corresponding to data actually provided by the selected equipment while hiding any extraneous graphical elements or points.

Figure 47:
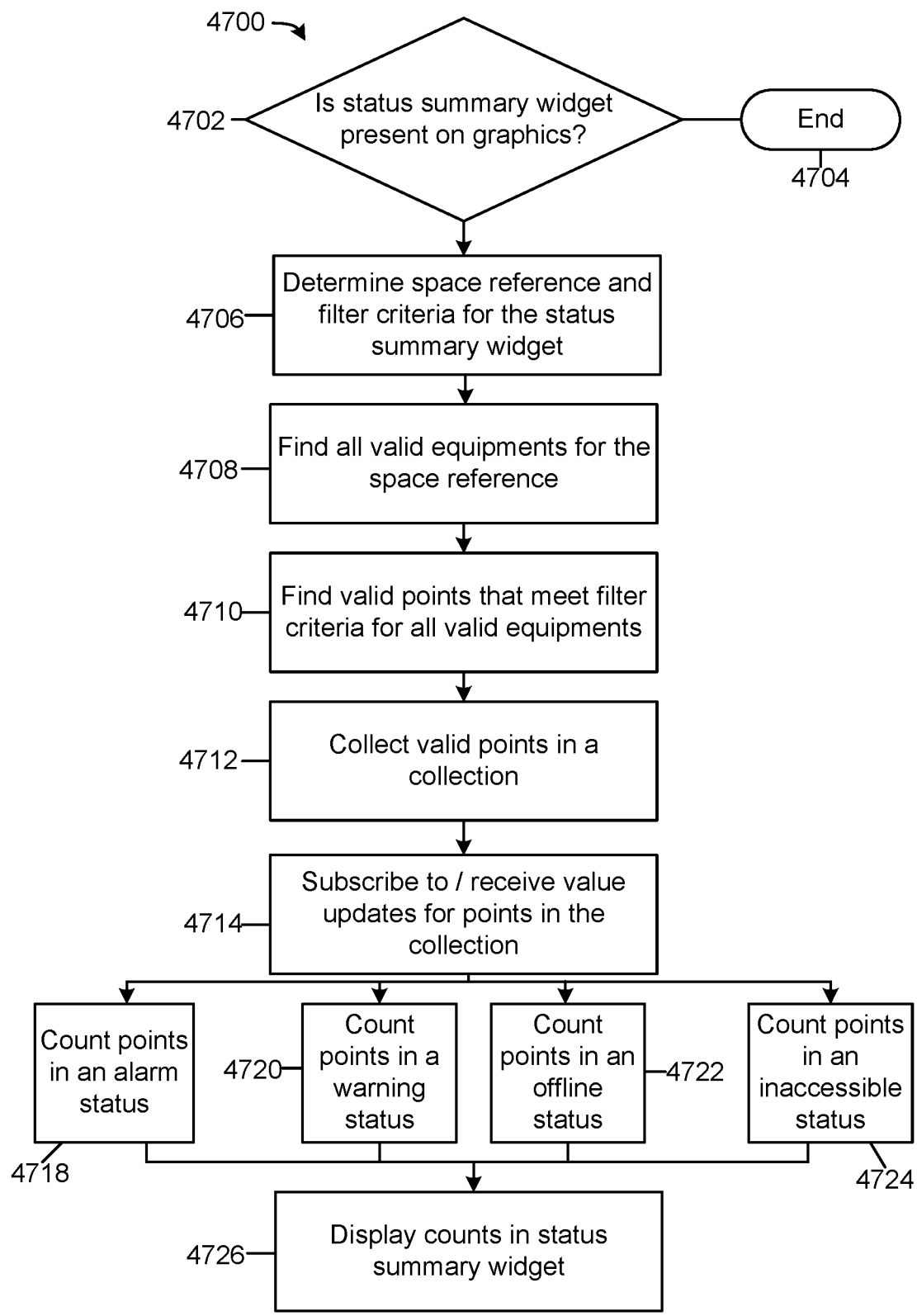
FIG. 47 is a flowchart of a process for generating a status summary widget as in FIGS. 36-37, according to an exemplary embodiment

Referring now to FIG. 47, a process 4700 for generating a status summary widget as in FIGS. 36-37 is shown, according to an exemplary embodiment. To start, at step 4702 determines if a status summary widget is present on the graphics (e.g., status summary widget 3606 of FIG. 36). Although multiple status summary widgets may be present, for the sake of clarity the following description refers to only a single status summary widget. If no status summary widget is present, the process 4700 ends at step 4704.

If a status summary widget is present in the graphics, at step 4706 the graphics manager determines the space reference and filter criteria for the status summary widget. The space reference and filter criteria may be input by a user via interface 3700 of FIG. 37, for example by inputting a space reference corresponding to a selected space, choosing if a child space of the selected space should be included, and providing point short names that determine the filter criteria. At step 4708, all valid equipment for the space reference are found (i.e., devices of building equipment associated with the selected space). At step 4710, all valid points that meet filter criteria are found for all valid equipment found in step 4708. That is, all points provided by each of the valid equipment are checked against the filter criteria, and those that match the filter criteria are identified as valid points. At step 4712, the valid points are collected in a collection.

At step 4714, the graphics manager subscribes to and receives value updates for points in the collection (i.e., data provided for those points by the equipment). Using the received value updates, metrics for inclusion in the status summary widget are determined. More particularly, at step 4718, points in an alarm status are counted to determine an alarm count; at step 4720, points in a warning status are counted to determine a warning count; at step 4722, points in an offline status are counted to determine an offline count; and, at step 4724, points in an inaccessible status are counted to determine an inaccessible count.

At step 4726, the alarm count, the warning count, the offline count, and the inaccessible count are displayed in the status summary widget on the graphics. In some cases, the graphics manager continues to subscribed to an receive value updates for points in the collection, such that the process 4700 loops back to step 4714 and through steps 4718-4724 to determine and display updated counts as values change in substantially real-time.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system, comprising:
a plurality of devices of building equipment;
a system manager configured to control the devices of building equipment and generate a user interface, the user interface comprising:
a command widget configured to allow a user to input a first command to control a first device of the plurality of devices of building equipment; and
an add annotation box configured to allow the user to add an annotation to the first command;
wherein the system manager is further configured to control the first device in response to the first command and store the annotation in an annotation database.

2. The building management system of claim 1, wherein:
the annotation database comprises a plurality of command annotations; and
the system manager is further configured to generate a report comprising the annotation and the plurality of command annotations.

3. The building management system of claim 1, wherein the system manager is further configured to store an identifier of the first device and a description of the first command with the annotation in the annotation database.

4. The building management system of claim 3, wherein:
the annotation database comprises a plurality of command annotations, a portion of the plurality of command annotations stored with the identifier of the first device; and
the system manager is further configured to generate a report corresponding to the first device comprising the annotation and the portion of the plurality of command annotations stored with the identifier of the first device.

5. The building management system of claim 1, wherein:
the annotation database further comprises a plurality of no-annotation indications corresponding to additional commands for which no annotation was entered in the add annotation box; and
the system manager is further configured to generate a report comprising the plurality of no-annotation indications.

6. The building management system of claim 1, wherein the add annotation box allows the user to add the annotation by inputting text to the add annotation box.

7. The building management system of claim 1, wherein the add annotation box allows the user to select the annotation from a predetermined list of possible annotations.

8. A building management system comprising:
a plurality of devices of a singular type of building equipment; and
a system manager configured to:
store an equipment definition, the equipment definition representing the plurality of devices and comprising characteristics shared by the plurality of devices of the singular type of building equipment;
associate an aliased graphic with the equipment definition, the aliased graphic comprising an image of a device of the singular type of building equipment associated with the equipment definition and identifying the characteristics shared by the plurality of devices; and
generate a graphical user interface that displays an instance of the aliased graphic for each of the plurality of devices.

9. The building management system of claim 8, the graphical user interface further comprising an aliased graphic assignment module that allows a user to assign the aliased graphic to an equipment type.

10. The building management system of claim 9, wherein:
a portion of the plurality of devices have an exceptional characteristic that differentiates the portion of the plurality of devices from a remainder of the plurality of devices;
the system manager is further configured to associate an exception graphic with the portion of the plurality of devices having the exceptional characteristic and replace, on the graphical user interface, the instance of the aliased graphic with an instance of the exception graphic for each device in the portion of the plurality of devices having the exceptional characteristic; and
the exception graphic includes a graphical representation of the exceptional characteristic.

11. The building management system of claim 10, the graphical user interface further comprising an exception graphic assignment module that allows the user to assign exception graphics to one or more of the plurality of devices.

12. The building management system of claim 9, wherein:
each device includes present components from a set of possible components for the equipment type, each component configured to provide data corresponding to a component point type to the system manager; and
the aliased graphic includes a graphical representation of each possible component; and
the system manager is further configured, for each device of the plurality of devices, to:
receive data corresponding to the component point types;
determine the present components based on the component point types of the received data; and
show graphical representations of the present components in the instance of the aliased graphic for the device and hide graphical representations of non-present components in the instance of the aliased graphic for the device in the graphical user interface.

13. The building management system of claim 8, wherein the system manager is further configured to provide a graphics creation module configured to allow a user to create a new graphic and assign the new graphic as the aliased graphic.

14. A building management system comprising:
building equipment corresponding to a plurality of spaces and operable to provide data corresponding to points;
a graphics manager configured to:
generate a user interface, the user interface comprising:
a status summary widget; and
a binding interface, the binding interface configured to allow a user to request to bind status the status summary widget to a selected space of the plurality of spaces; and
in response to a user request to bind the status summary widget to the selected space of the plurality of spaces, auto-configure the status summary widget by determining relevant points corresponding to the selected space, receiving relevant data corresponding to the relevant points, and providing metrics based on the relevant data in the status summary widget.

15. The building management system of claim 14, wherein:
the building equipment comprises a first set of devices corresponding to the selected space; and
the graphics manager is configured to determine the relevant points corresponding to the selected space by:

identifying the first set of devices; and determining the relevant points as points corresponding to the first set of devices.

16. The building management system of claim 14, wherein:

each point has a point type;

the binding interface is further configured to allow a user to input a point type filter identifying a selected point type; and the relevant points are determined as points corresponding to the selected space and having the selected point type.

17. The building management system of claim 16, wherein the binding interface allows the user to input a point type filter by providing an entry blank configured to accept a point short name that corresponds to the selected point type.

18. The building management system of claim 14, wherein:

the plurality of spaces includes one or more child spaces of the selected space;

the binding interface is further configured to provide an option for the user to request to include the one or more child spaces with the selected space; and the graphics manager is further configured to, in response to a user request to include the one or more child spaces with the selected space, determine the relevant points as points corresponding to the selected space and points corresponding to the one or more child spaces.

19. The building management system of claim 14, wherein the metrics include an alarm count determined as a count of relevant points in an alarm status, a warning count determined as a count of relevant points in a warning status, an offline count determined as a count of relevant points in an offline status, and a value inaccessible count determined as a count of relevant points in a value inaccessible status.

20. The building management system of claim 14 wherein the graphics manager is further configured to receive updated data corresponding to the relevant points and update the metrics to include the updated data.

\* \* \* \* \*